United States Patent
Choi et al.

(10) Patent No.: US 12,010,693 B2
(45) Date of Patent: Jun. 11, 2024

(54) METHOD FOR RECEIVING PHYSICAL CONTROL CHANNEL IN WIRELESS COMMUNICATION SYSTEM, AND DEVICE USING SAME

(71) Applicant: WILUS INSTITUTE OF STANDARDS AND TECHNOLOGY INC., Gyeonggi-do (KR)

(72) Inventors: Kyungjun Choi, Gyeonggi-do (KR); Minseok Noh, Seoul (KR); Jinsam Kwak, Gyeonggi-do (KR)

(73) Assignee: WILUS INSTITUTE OF STANDARDS AND TECHNOLOGY INC., Gyeonggi-Do (KR)

(*) Notice: Subject to any disclaimer, the term of this patent is extended or adjusted under 35 U.S.C. 154(b) by 517 days.

(21) Appl. No.: 17/264,812

(22) PCT Filed: Aug. 20, 2019

(86) PCT No.: PCT/KR2019/010604
§ 371 (c)(1),
(2) Date: Jan. 30, 2021

(87) PCT Pub. No.: WO2020/040534
PCT Pub. Date: Feb. 27, 2020

(65) Prior Publication Data
US 2021/0297998 A1    Sep. 23, 2021

(30) Foreign Application Priority Data
Aug. 20, 2018 (KR) .................. 10-2018-0097078
Aug. 21, 2018 (KR) .................. 10-2018-0097094

(51) Int. Cl.
*H04W 72/23* (2023.01)
*H04W 72/0446* (2023.01)

(52) U.S. Cl.
CPC ........ *H04W 72/23* (2023.01); *H04W 72/0446* (2013.01)

(58) Field of Classification Search
CPC .................. H04W 72/0446; H04W 72/23
See application file for complete search history.

(56) References Cited

U.S. PATENT DOCUMENTS

2001/0056456 A1* 12/2001 Cota-Robles ......... G06F 9/4843
718/103
2019/0254053 A1* 8/2019 Ying .................. H04L 5/00
(Continued)

FOREIGN PATENT DOCUMENTS

CN 107196747 9/2017
CN 108419296 8/2018
(Continued)

OTHER PUBLICATIONS

Office Action dated Dec. 9, 2022 for Indian Patent Application No. 202127002306.
(Continued)

*Primary Examiner* — Yee F Lam
(74) *Attorney, Agent, or Firm* — Ladas & Parry, LLP

(57) ABSTRACT

A base station in a wireless communication system is provided. Each base station for wireless communication comprises: a communication module; and a processor. The processor is configured to determine the number of dynamic slot format information (SFI) bits based on a maximum value of a slot format combination index which can be indicated by dynamic SFI transmitted to a terminal, and monitor a physical downlink control channel (PDCCH) including the dynamic SFI based on the number of the dynamic SFI bits. The slot format combination index identifies a slot format combination configured for the terminal. The slot format combination indicates a type of a symbol included in one or more slots, and the type of the symbol is (Continued)

S1301 — DETERMINE NUMBER OF DYNAMIC SFI BITS TO BE MONITERED BY TERMINAL

S1303 — MONITOR PDCCH INCLUDING SFI BASED ON DETERMINED NUMBER OF BITS one among a downlink symbol, an uplink symbol, and a flexible symbol.

14 Claims, 13 Drawing Sheets

(56) References Cited

U.S. PATENT DOCUMENTS

| | | | |
|---|---|---|---|
| 2019/0306857 A1* | 10/2019 | Lin | H04L 5/0007 |
| 2019/0312665 A1* | 10/2019 | Jo | H04L 27/26025 |
| 2019/0335493 A1* | 10/2019 | Xiong | H04L 5/0057 |
| 2019/0349180 A1* | 11/2019 | Lu | H04L 27/2607 |
| 2020/0028659 A1* | 1/2020 | Huang | H04L 5/0092 |
| 2020/0045696 A1* | 2/2020 | Huang | H04L 5/10 |
| 2020/0052865 A1* | 2/2020 | Liou | H04W 74/0808 |
| 2020/0053728 A1* | 2/2020 | Huang | H04L 27/26025 |
| 2020/0120672 A1* | 4/2020 | Shen | H04L 1/1614 |
| 2021/0320833 A1* | 10/2021 | Kim | H04W 74/0833 |
| 2021/0329634 A1* | 10/2021 | Kim | H04L 27/26 |
| 2022/0294597 A1* | 9/2022 | Ibrahim | H04L 41/0893 |

FOREIGN PATENT DOCUMENTS

| | | |
|---|---|---|
| KR | 10-2018-0081464 | 7/2018 |
| WO | 2013/048070 | 4/2013 |
| WO | 2018/145019 | 8/2018 |

OTHER PUBLICATIONS

International Search Report for PCT/KR2019/010604 mailed on Dec. 12, 2019 and its English translation from WIPO (now published as WO 2020/040534).

Written Opinion of the International Searching Authority for PCT/KR2019/010604 mailed on Dec. 12, 2019 and its English translation by Google Translate (now published as WO 2020/040534).

Qualcomm Inc. "Offline discussion summary on remaining issues on GC-PDCCH carrying SFI", R1-1803498. 3GPP TSG RAN WG1 #92. Athens, Greece. Mar. 5, 2018. See pp. 2-6.

ZTE et.: "Remaining details on group-common PDCCH". R1-1719670, 3GPP TSG RAN WG1 Meeting #91. Reno, USA. Nov. 18, 2017. See pp. 1, 5-7; and figure 1.

ASUSTEK: "Remaining issues for SFI". R1-1806913. 3GPP TSG RAN WG1 Meeting #93. Busan, Korea. May 12, 2018. See pp. 2-5.

Office Action dated Nov. 13, 2023 for Chinese Patent Application No. 201980052821.0 and its English translation provided by Applicant's foreign counsel.

3GPP TS 38.213 V15.2.0 (Jun. 2018): "$3^{rd}$ Generation Partnership Project; Technical Specification Group Radio Access Network; NR; Physical layer procedures for control (Release 15)", 38213-f20, Jun. 29, 2018, pp. 1-96.

Qualcomm Incorporated: "Summary on remaining issues on GC-PDCCH carrying SFI", 3GPP TSG RAN WG1 #92, R1-1803270, Feb. 27, 2018, Athens, Greece, pp. 1-12.

Samsung: "Remaining Issues on PDCCH and Search Space Design", 3GPP TSG RAN WG1 Meeting #94, R1-1808753, Gothenburg, Sweden, Aug. 10, 2018, pp. 1-8.

* cited by examiner

```
-- ASN1START
-- TAG-SLOTFORMATCOMBINATIONSPERCELL-START

SlotFormatCombinationsPerCell ::=   SEQUENCE {
    servingCellId                       ServCellIndex,
    subcarrierSpacing                   SubcarrierSpacing,
    subcarrierSpacing2                  SubcarrierSpacing                                              OPTIONAL,    -- Need R
    slotFormatCombinations              SEQUENCE (SIZE (1..maxNrofSlotFormatCombinationsPerSet)) OF SlotFormatCombination
                                                                                                       OPTIONAL,    -- Need M
    positionInDCI                       INTEGER(0..maxSFI-DCI-PayloadSize-1)                           OPTIONAL,    -- Need M
    ...
}

SlotFormatCombination ::=   SEQUENCE {
    slotFormatCombinationId,
    slotFormats                         SEQUENCE (SIZE (1..maxNrofSlotFormatsPerCombination)) OF INTEGER (0..255)
}

SlotFormatCombinationId ::=     INTEGER (0..maxNrofSlotFormatCombinationsPerSet-1)

-- TAG-SLOTFORMATCOMBINATIONSPERCELL-STOP
-- ASN1STOP
```

*FIG. 12*

METHOD FOR RECEIVING PHYSICAL CONTROL CHANNEL IN WIRELESS COMMUNICATION SYSTEM, AND DEVICE USING SAME

CROSS-REFERENCE TO RELATED APPLICATIONS

The present application is the U.S. National Phase of PCT Application No. PCT/KR2019/010604 filed on Aug. 20, 2019, which claims the priority to Korean Patent Application No. 10-2018-0097078 filed on Aug. 20, 2018 and Korean Patent Application No. 10-2018-0097094 filed on Aug. 21, 2018, the entire contents of which are incorporated herein by reference.

TECHNICAL FIELD

The present disclosure relates to a wireless communication system. More specifically, the present disclosure relates to a method for receiving a physical control channel in a wireless communication system, and a device using the same.

BACKGROUND ART

After commercialization of 4th generation (4G) communication system, in order to meet the increasing demand for wireless data traffic, efforts are being made to develop new 5th generation (5G) communication systems. The 5G communication system is called as a beyond 4G network communication system, a post LTE system, or a new radio (NR) system. In order to achieve a high data transfer rate, 5G communication systems include systems operated using the millimeter wave (mmWave) band of 6 GHz or more, and include a communication system operated using a frequency band of 6 GHz or less in terms of ensuring coverage so that implementations in base stations and terminals are under consideration.

A 3rd generation partnership project (3GPP) NR system enhances spectral efficiency of a network and enables a communication provider to provide more data and voice services over a given bandwidth. Accordingly, the 3GPP NR system is designed to meet the demands for high-speed data and media transmission in addition to supports for large volumes of voice. The advantages of the NR system are to have a higher throughput and a lower latency in an identical platform, support for frequency division duplex (FDD) and time division duplex (TDD), and a low operation cost with an enhanced end-user environment and a simple architecture.

For more efficient data processing, dynamic TDD of the NR system may use a method for varying the number of orthogonal frequency division multiplexing (OFDM) symbols that may be used in an uplink and downlink according to data traffic directions of cell users. For example, when the downlink traffic of the cell is larger than the uplink traffic, the base station may allocate a plurality of downlink OFDM symbols to a slot (or subframe). Information about the slot configuration should be transmitted to the terminals.

In order to alleviate the path loss of radio waves and increase the transmission distance of radio waves in the mmWave band, in 5G communication systems, beamforming, massive multiple input/output (massive MIMO), full dimensional MIMO (FD-MIMO), array antenna, analog beam-forming, hybrid beamforming that combines analog beamforming and digital beamforming, and large scale antenna technologies are discussed. In addition, for network improvement of the system, in the 5G communication system, technology developments related to evolved small cells, advanced small cells, cloud radio access network (cloud RAN), ultra-dense network, device to device communication (D2D), vehicle to everything communication (V2X), wireless backhaul, non-terrestrial network communication (NTN), moving network, cooperative communication, coordinated multi-points (CoMP), interference cancellation, and the like are being made. In addition, in the 5G system, hybrid FSK and QAM modulation (FQAM) and sliding window superposition coding (SWSC), which are advanced coding modulation (ACM) schemes, and filter bank multi-carrier (FBMC), non-orthogonal multiple access (NOMA), and sparse code multiple access (SCMA), which are advanced connectivity technologies, are being developed.

Meanwhile, in a human-centric connection network where humans generate and consume information, the Internet has evolved into the Internet of Things (IoT) network, which exchanges information among distributed components such as objects. Internet of Everything (IoE) technology, which combines IoT technology with big data processing technology through connection with cloud servers, is also emerging. In order to implement IoT, technology elements such as sensing technology, wired/wireless communication and network infrastructure, service interface technology, and security technology are required, so that in recent years, technologies such as sensor network, machine to machine (M2M), and machine type communication (MTC) have been studied for connection between objects. In the IoT environment, an intelligent internet technology (IT) service that collects and analyzes data generated from connected objects to create new value in human life can be provided. Through the fusion and mixture of existing information technology (IT) and various industries, IoT can be applied to fields such as smart home, smart building, smart city, smart car or connected car, smart grid, healthcare, smart home appliance, and advanced medical service.

Accordingly, various attempts have been made to apply the 5G communication system to the IoT network. For example, technologies such as a sensor network, a machine to machine (M2M), and a machine type communication (MTC) are implemented by techniques such as beamforming, MIMO, and array antennas. The application of the cloud RAN as the big data processing technology described above is an example of the fusion of 5G technology and IoT technology. Generally, a mobile communication system has been developed to provide voice service while ensuring the user's activity.

However, the mobile communication system is gradually expanding not only the voice but also the data service, and now it has developed to the extent of providing high-speed data service. However, in a mobile communication system in which services are currently being provided, a more advanced mobile communication system is required due to a shortage phenomenon of resources and a high-speed service demand of users.

DISCLOSURE

Technical Problem

An objective of an embodiment of the present invention is to provide a method for effectively receiving a physical control channel in a wireless communication system, and a device therefor.

Technical Solution

User equipment in a wireless communication system according to an embodiment of the present invention includes a communication module and a processor configured to control the communication module. The processor is configured to determine the number of dynamic SFI bits based on a maximum value of slot format combination indexes capable of being indicated by dynamic slot format information (SFI) transmitted to the user equipment and monitor a physical downlink control channel (PDCCH) including the dynamic SFI based on the number of dynamic SFI bits. The slot format combination index indicated by the dynamic SFI transmitted to the user equipment identifies a slot format combination configured for the user equipment. The slot format combination indicates the types of symbols included in one or more slots, and the type of symbol is any one of a downlink symbol, an uplink symbol, and a flexible symbol.

The processor may be configured to determine the number of dynamic SFI bits to be 1 when the maximum value is 0.

The processor may be configured to determine the number of dynamic SFI bits according to max(ceil($\log_2$(maxSFIindex+1)), 1). max(a, b) represents a greater value of "a" and "b", and maxSFIindex represents the maximum value.

The processor may be configured to determine a slot format combination configured for the user equipment based on a value of the dynamic SFI, and may perform transmission or reception based on the determined slot format combination when the user equipment receives the dynamic SFI.

The processor may be configured to perform operations corresponding to the case where a PDCCH including the dynamic SFI fails to be received when the maximum value is 0 and the value of the dynamic SFI received by the user equipment is 1.

The processor may be configured to cancel transmission and reception of semi-static radio resource control (RRC)-configured measurement signals when the maximum value is 0 and the value of the dynamic SFI received by the user equipment is 1.

The processor may be configured not to expect the value of the dynamic SFI to be 1 when the maximum value is 0.

A method of operating a user equipment in a wireless communication system according to an embodiment of the present invention includes determining the number of dynamic SFI bits based on a maximum value of slot format combination indexes capable of being indicated by dynamic SFI transmitted to the user equipment and monitoring a PDCCH including the dynamic SFI based on the number of dynamic SFI bits. The slot format combination index indicated by the dynamic SFI transmitted to the user equipment identifies a slot format combination configured for the user equipment. The slot format combination indicates the types of symbols included in one or more slots, and the type of symbol is any one of a downlink symbol, an uplink symbol, and a flexible symbol.

The determining the number of dynamic SFI bits may include determining the number of dynamic SFI bits to be 1 when the maximum value is 0.

The determining the number of dynamic SFI bits to be 1 may include determining the number of dynamic SFI bits according to max(ceil($\log_2$(maxSFIindex+1)), 1). max(a, b) represents a greater value of "a" and "b", and maxSFIindex represents the maximum value.

The operation method may further include determining a slot format combination configured for the user equipment based on a value of the dynamic SFI and performing transmission or reception based on the determined slot format combination when the user equipment receives the dynamic SFI.

The operation method may further include performing operations corresponding to the case where a PDCCH including the dynamic SFI fails to be received when the maximum value is 0 and the value of the dynamic SFI is 1.

The operation method may further include cancelling transmission and reception of semi-static radio resource control (RRC)-configured measurement signals when the maximum value is 0 and the value of the dynamic SFI is 1.

The operation method may further include not expecting the value of the dynamic SFI to be 1 when the maximum value is 0.

Advantageous Effects

An embodiment of the present invention provides a method for effectively receiving a physical control channel in a wireless communication system, and a device using the same.

Effects obtainable from various embodiments of the present disclosure are not limited to the above-mentioned effects, and other effects not mentioned above may be clearly derived and understood to those skilled in the art from the following description.

DESCRIPTION OF DRAWINGS

FIG. 12 shows a format of a slot format combination indicator according to an embodiment of the present invention.

MODE FOR CARRYING OUT THE INVENTION

Figure 1:
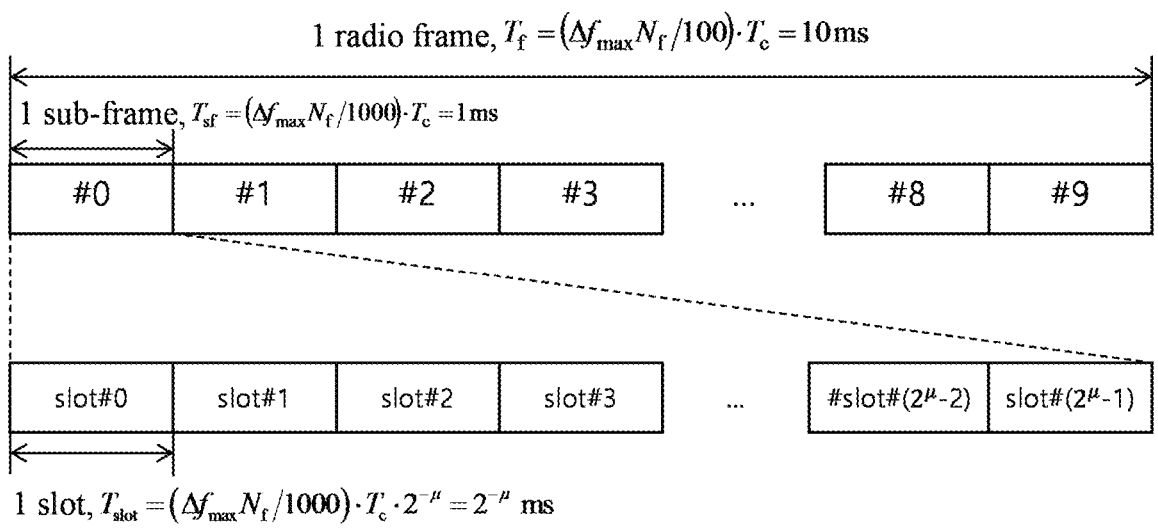
FIG. 1 illustrates an example of a wireless frame structure used in a wireless communication system.

Terms used in the specification adopt general terms which are currently widely used as possible by considering functions in the present invention, but the terms may be changed depending on an intention of those skilled in the art, customs, and emergence of new technology. Further, in a specific case, there is a term arbitrarily selected by an applicant and in this case, a meaning thereof will be described in a corresponding description part of the invention. Accordingly, it intends to be revealed that a term used in the specification should be analyzed based on not just a name of the term but a substantial meaning of the term and contents throughout the specification.

Throughout this specification and the claims that follow, when it is described that an element is "connected" to another element, the element may be "directly connected" to the other element or "electrically connected" to the other element through a third element. Further, unless explicitly described to the contrary, the word "comprise" will be understood to imply the inclusion of stated elements but not the exclusion of any other elements unless otherwise stated. Moreover, limitations such as "more than or equal to" or "less than or equal to" based on a specific threshold may be appropriately substituted with "more than" or "less than", respectively, in some exemplary embodiments.

The following technology may be used in various wireless access systems, such as code division multiple access (CDMA), frequency division multiple access (FDMA), time division multiple access (TDMA), orthogonal frequency division multiple access (OFDMA), single carrier-FDMA (SC-FDMA), and the like. The CDMA may be implemented by a wireless technology such as universal terrestrial radio access (UTRA) or CDMA2000. The TDMA may be implemented by a wireless technology such as global system for mobile communications (GSM)/general packet radio service (GPRS)/enhanced data rates for GSM evolution (EDGE). The OFDMA may be implemented by a wireless technology such as IEEE 802.11 (Wi-Fi), IEEE 802.16 (WiMAX), IEEE 802-20, evolved UTRA (E-UTRA), and the like. The UTRA is a part of a universal mobile telecommunication system (UMTS). 3rd generation partnership project (3GPP) long term evolution (LTE) is a part of an evolved UMTS (E-UMTS) using evolved-UMTS terrestrial radio access (E-UTRA) and LTE-advanced (A) is an evolved version of the 3GPP LTE. 3GPP new radio (NR) is a system designed separately from LTE/LTE-A, and is a system for supporting enhanced mobile broadband (eMBB), ultra-reliable and low latency communication (URLLC), and massive machine type communication (mMTC) services, which are requirements of IMT-2020. For the clear description, 3GPP NR is mainly described, but the technical idea of the present invention is not limited thereto.

Unless otherwise specified herein, the base station may include a next generation node B (gNB) defined in 3GPP NR. Furthermore, unless otherwise specified, a terminal may include a user equipment (UE). Hereinafter, in order to help the understanding of the description, each content is described separately by the embodiments, but each embodiment may be used in combination with each other. In the present specification, the configuration of the UE may indicate a configuration by the base station. In more detail, the base station may configure a value of a parameter used in an operation of the UE or a wireless communication system by transmitting a channel or a signal to the UE.

FIG. 1 illustrates an example of a wireless frame structure used in a wireless communication system.

Referring to FIG. 1, the wireless frame (or radio frame) used in the 3GPP NR system may have a length of 10 ms ($\Delta f_{max} N_f/100)*T_c$). In addition, the wireless frame includes 10 subframes (SFs) having equal sizes. Herein, $\Delta f_{max}=480*10^3$ Hz, $N_f=4096$, $T_c=1/(\Delta f_{ref}*N_{f,ref})$, $\Delta f_{ref}=15*10^3$ Hz, and $N_{f,ref}=2048$. Numbers from 0 to 9 may be respectively allocated to 10 subframes within one wireless frame. Each subframe has a length of 1 ms and may include one or more slots according to a subcarrier spacing. More specifically, in the 3GPP NR system, the subcarrier spacing that may be used is $15*2^\mu$ kHz, and μ can have a value of μ=0, 1, 2, 3, 4 as subcarrier spacing configuration. That is, 15 kHz, 30 kHz, 60 kHz, 120 kHz and 240 kHz may be used for subcarrier spacing. One subframe having a length of 1 ms may include $2^\mu$ slots. In this case, the length of each slot is $2^{-\mu}$ ms. Numbers from 0 to $2^\mu-1$ may be respectively allocated to $2^\mu$ slots within one wireless frame. In addition, numbers from 0 to $10*2^\mu-1$ may be respectively allocated to slots within one subframe. The time resource may be distinguished by at least one of a wireless frame number (also referred to as a wireless frame index), a subframe number (also referred to as a subframe index), and a slot number (or a slot index).

Figure 2:
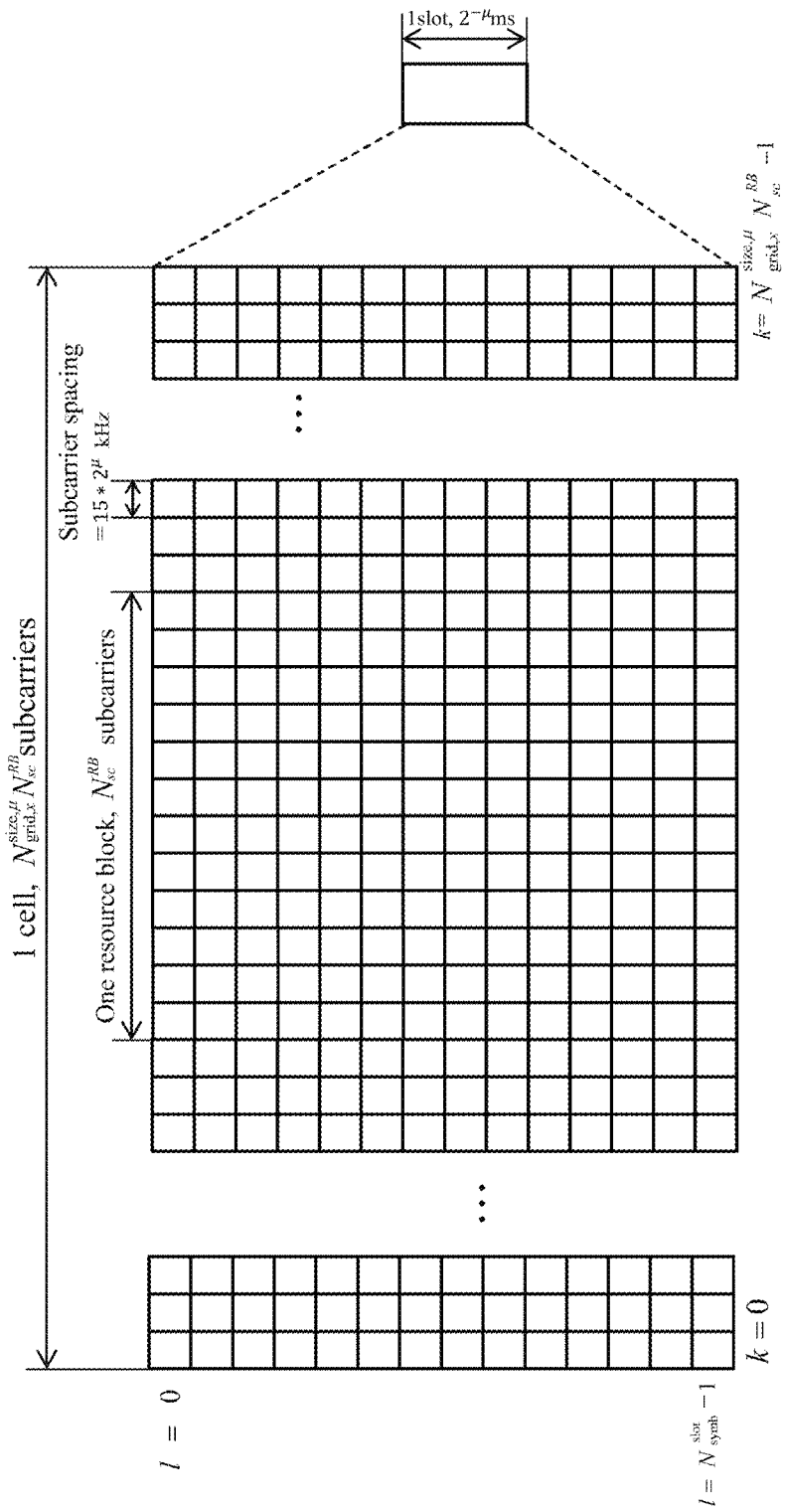
FIG. 2 illustrates an example of a downlink (DL)/uplink (UL) slot structure in a wireless communication system.

FIG. 2 illustrates an example of a downlink (DL)/uplink (UL) slot structure in a wireless communication system. In particular, FIG. 2 shows the structure of the resource grid of the 3GPP NR system.

There is one resource grid per antenna port. Referring to FIG. 2, a slot includes a plurality of orthogonal frequency division multiplexing (OFDM) symbols in a time domain and includes a plurality of resource blocks (RBs) in a frequency domain. An OFDM symbol also means one symbol section. Unless otherwise specified, OFDM symbols may be referred to simply as symbols. One RB includes 12 consecutive subcarriers in the frequency domain. Referring to FIG. 2, a signal transmitted from each slot may be represented by a resource grid including $N^{size,\mu}_{grid,x}*N^{RB}_{sc}$ subcarriers, and $N^{slot}_{symb}$ OFDM symbols. Here, x=DL when the signal is a DL signal, and x=UL when the signal is an UL signal. $N^{size,\mu}_{grid,x}$ represents the number of resource blocks (RBs) according to the subcarrier spacing constituent μ (x is DL or UL), and $N^{slot}_{symb}$ represents the number of OFDM symbols in a slot. $N^{RB}_{sc}$ is the number of subcarriers constituting one RB and $N^{RB}_{sc}=12$. An OFDM symbol may be referred to as a cyclic shift OFDM (CP-OFDM) symbol or a discrete Fourier transform spread OFDM (DFT-s-OFDM) symbol according to a multiple access scheme.

The number of OFDM symbols included in one slot may vary according to the length of a cyclic prefix (CP). For example, in the case of a normal CP, one slot includes 14 OFDM symbols, but in the case of an extended CP, one slot may include 12 OFDM symbols. In a specific embodiment, the extended CP can only be used at 60 kHz subcarrier spacing. In FIG. 2, for convenience of description, one slot is configured with 14 OFDM symbols by way of example, but embodiments of the present disclosure may be applied in a similar manner to a slot having a different number of OFDM symbols. Referring to FIG. 2, each OFDM symbol includes $N^{size,\mu}_{grid,x}*N^{RB}_{sc}$ subcarriers in the frequency domain. The type of subcarrier may be divided into a data subcarrier for data transmission, a reference signal subcarrier for transmission of a reference signal, and a guard band. The carrier frequency is also referred to as the center frequency (fc).

One RB may be defined by $N^{RB}_{sc}$ (e. g., 12) consecutive subcarriers in the frequency domain. For reference, a resource configured with one OFDM symbol and one subcarrier may be referred to as a resource element (RE) or a tone. Therefore, one RB can be configured with $N^{slot}_{symb}*N^{RB}_{sc}$ resource elements. Each resource element in the resource grid can be uniquely defined by a pair of indexes (k, l) in one slot. k may be an index assigned from 0 to $N^{size,\mu}_{grid,x} * N^{RB}_{sc} - 1$ in the frequency domain, and l may be an index assigned from 0 to $N^{slot}_{symb} - 1$ in the time domain.

In order for the UE to receive a signal from the base station or to transmit a signal to the base station, the time/frequency of the UE may be synchronized with the time/frequency of the base station. This is because when the base station and the UE are synchronized, the UE can determine the time and frequency parameters necessary for demodulating the DL signal and transmitting the UL signal at the correct time.

Each symbol of a radio frame used in a time division duplex (TDD) or an unpaired spectrum may be configured with at least one of a DL symbol, an UL symbol, and a flexible symbol. A radio frame used as a DL carrier in a frequency division duplex (FDD) or a paired spectrum may be configured with a DL symbol or a flexible symbol, and a radio frame used as a UL carrier may be configured with a UL symbol or a flexible symbol. In the DL symbol, DL transmission is possible, but UL transmission is unavailable. In the UL symbol, UL transmission is possible, but DL transmission is unavailable. The flexible symbol may be determined to be used as a DL or an UL according to a signal.

Information on the type of each symbol, i.e., information representing any one of DL symbols, UL symbols, and flexible symbols, may be configured with a cell-specific or common radio resource control (RRC) signal. In addition, information on the type of each symbol may additionally be configured with a UE-specific or dedicated RRC signal. The base station informs, by using cell-specific RRC signals, i) the period of cell-specific slot configuration, ii) the number of slots with only DL symbols from the beginning of the period of cell-specific slot configuration, iii) the number of DL symbols from the first symbol of the slot immediately following the slot with only DL symbols, iv) the number of slots with only UL symbols from the end of the period of cell specific slot configuration, and v) the number of UL symbols from the last symbol of the slot immediately before the slot with only the UL symbol. Here, symbols not configured with any one of a UL symbol and a DL symbol are flexible symbols.

When the information on the symbol type is configured with the UE-specific RRC signal, the base station may signal whether the flexible symbol is a DL symbol or an UL symbol in the cell-specific RRC signal. In this case, the UE-specific RRC signal can not change a DL symbol or a UL symbol configured with the cell-specific RRC signal into another symbol type. The UE-specific RRC signal may signal the number of DL symbols among the $N^{slot}_{symb}$ symbols of the corresponding slot for each slot, and the number of UL symbols among the $N^{slot}_{symb}$ symbols of the corresponding slot. In this case, the DL symbol of the slot may be continuously configured with the first symbol to the i-th symbol of the slot. In addition, the UL symbol of the slot may be continuously configured with the j-th symbol to the last symbol of the slot (where i<j). In the slot, symbols not configured with any one of a UL symbol and a DL symbol are flexible symbols.

Figure 3:
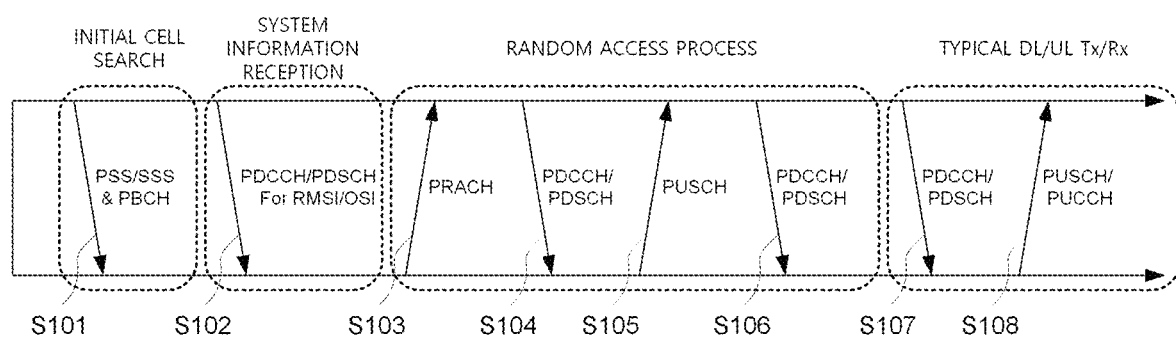
FIG. 3 is a diagram for explaining a physical channel used in a 3GPP system and a typical signal transmission method using the physical channel.

FIG. 3 is a diagram for explaining a physical channel used in a 3GPP system (e.g., NR) and a typical signal transmission method using the physical channel.

If the power of the UE is turned on or the UE camps on a new cell, the UE performs an initial cell search (S101). Specifically, the UE may synchronize with the BS in the initial cell search. For this, the UE may receive a primary synchronization signal (PSS) and a secondary synchronization signal (SSS) from the base station to synchronize with the base station, and obtain information such as a cell ID. Thereafter, the UE can receive the physical broadcast channel from the base station and obtain the broadcast information in the cell.

Upon completion of the initial cell search, the UE receives a physical downlink shared channel (PDSCH) according to the physical downlink control channel (PDCCH) and information in the PDCCH, so that the UE can obtain more specific system information than the system information obtained through the initial cell search (S102). Herein, the system information received by the UE is cell-common system information for normal operating of the UE in a physical layer in radio resource control (RRC) and is referred to remaining system information, or system information block (SIB) 1 is called.

When the UE initially accesses the base station or does not have radio resources for signal transmission (i.e. the UE at RRC_IDLE mode), the UE may perform a random access procedure on the base station (operations S103 to S106). First, the UE can transmit a preamble through a physical random access channel (PRACH) (S103) and receive a response message for the preamble from the base station through the PDCCH and the corresponding PDSCH (S104). When a valid random access response message is received by the UE, the UE transmits data including the identifier of the UE and the like to the base station through a physical uplink shared channel (PUSCH) indicated by the UL grant transmitted through the PDCCH from the base station (S105). Next, the UE waits for reception of the PDCCH as an indication of the base station for collision resolution. If the UE successfully receives the PDCCH through the identifier of the UE (S106), the random access process is terminated. The UE may obtain UE-specific system information for normal operating of the UE in the physical layer in RRC layer during a random access process. When the UE obtain the UE-specific system information, the UE enter RRC connecting mode (RRC_CONNECTED mode).

The RRC layer is used for generating or managing message for controlling connection between the UE and radio access network (RAN). In more detail, the base station and the UE, in the RRC layer, may perform broadcasting cell system information required by every UE in the cell, managing mobility and handover, measurement report of the UE, storage management including UE capability management and device management. In general, the RRC signal is not changed and maintained quite long interval since a period of an update of a signal delivered in the RRC layer is longer than a transmission time interval (TTI) in physical layer.

After the above-described procedure, the UE receives PDCCH/PDSCH (S107) and transmits a physical uplink shared channel (PUSCH)/physical uplink control channel (PUCCH) (S108) as a general UL/DL signal transmission procedure. In particular, the UE may receive downlink control information (DCI) through the PDCCH. The DCI may include control information such as resource allocation information for the UE. Also, the format of the DCI may vary depending on the intended use. The uplink control information (UCI) that the UE transmits to the base station through UL includes a DL/UL ACK/NACK signal, a channel quality indicator (CQI), a precoding matrix index (PMI), a rank indicator (RI), and the like. Here, the CQI, PMI, and RI may be included in channel state information (CSI). In the 3GPP NR system, the UE may transmit control information such as HARQ-ACK and CSI described above through the PUSCH and/or PUCCH.

Figure 4:
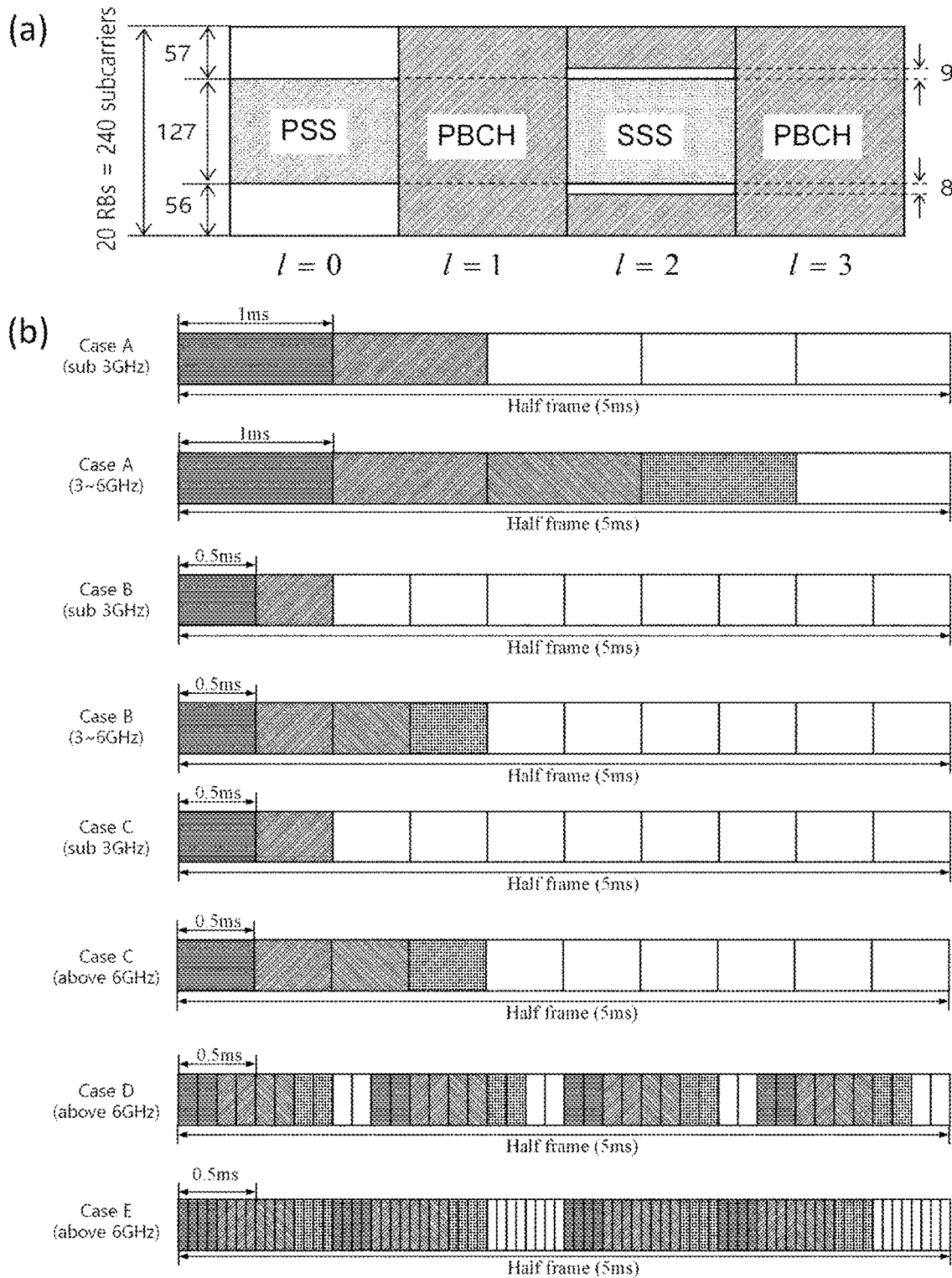
FIG. 4 illustrates an SS/PBCH block for initial cell access in a 3GPP NR system.

FIG. 4 illustrates an SS/PBCH block for initial cell access in a 3GPP NR system. When the power is turned on or wanting to access a new cell, the UE may obtain time and frequency synchronization with the cell and perform an initial cell search procedure. The UE may detect a physical cell identity $N^{cell}_{ID}$ of the cell during a cell search procedure. For this, the UE may receive a synchronization signal, for example, a primary synchronization signal (PSS) and a secondary synchronization signal (SSS), from a base station, and synchronize with the base station. In this case, the UE can obtain information such as a cell identity (ID).

Referring to FIG. 4A, a synchronization signal (SS) will be described in more detail. The synchronization signal can be classified into PSS and SSS. The PSS may be used to obtain time domain synchronization and/or frequency domain synchronization, such as OFDM symbol synchronization and slot synchronization. The SSS can be used to obtain frame synchronization and cell group ID. Referring to FIG. 4A and Table 1, the SS/PBCH block can be configured with consecutive 20 RBs (=240 subcarriers) in the frequency axis, and can be configured with consecutive 4 OFDM symbols in the time axis. In this case, in the SS/PBCH block, the PSS is transmitted in the first OFDM symbol and the SSS is transmitted in the third OFDM symbol through the 56th to 182th subcarriers. Here, the lowest subcarrier index of the SS/PBCH block is numbered from 0. In the first OFDM symbol in which the PSS is transmitted, the base station does not transmit a signal through the remaining subcarriers, i.e., 0th to 55th and 183th to 239th subcarriers. In addition, in the third OFDM symbol in which the SSS is transmitted, the base station does not transmit a signal through 48th to 55th and 183th to 191th subcarriers. The base station transmits a physical broadcast channel (PBCH) through the remaining RE except for the above signal in the SS/PBCH block.

TABLE 1

| Channel or signal | OFDM symbol number l relative to the start of an SS/PBCH block | Subcarrier number k relative to the start of an SS/PBCH block |
|---|---|---|
| PSS | 0 | 56, 57, . . . , 182 |
| SSS | 2 | 56, 57, . . . , 182 |
| Set to 0 | 0 | 0, 1, . . . , 55, 183, 184, . . . , 239 |
|  | 2 | 48, 49, . . . , 55, 183, 184, . . . , 191 |
| PBCH | 1, 3 | 0, 1, . . . , 239 |
|  | 2 | 0, 1, . . . , 47, 192, 193, . . . , 239 |
| DM-RS for PBCH | 1, 3 | 0 + v, 4 + v, 8 + v, . . . , 236 + v |
|  | 2 | 0 + v, 4 + v, 8 + v, . . . , 44 + v, 192 + v, 196 + v, . . . , 236 + v |

The SS allows a total of 1008 unique physical layer cell IDs to be grouped into 336 physical-layer cell-identifier groups, each group including three unique identifiers, through a combination of three PSSs and SSSs, specifically, such that each physical layer cell ID is to be only a part of one physical-layer cell-identifier group. Therefore, the physical layer cell ID $N^{cell}_{ID}=3N^{(1)}_{ID}+N^{(2)}_{ID}$ can be uniquely defined by the index $N^{(1)}_{ID}$ ranging from 0 to 335 indicating a physical-layer cell-identifier group and the index $N^{(2)}_{ID}$ ranging from 0 to 2 indicating a physical-layer identifier in the physical-layer cell-identifier group. The UE may detect the PSS and identify one of the three unique physical-layer identifiers. In addition, the UE can detect the SSS and identify one of the 336 physical layer cell IDs associated with the physical-layer identifier. In this case, the sequence $d_{PSS}(n)$ of the PSS is as follows.

$$d_{PSS}(n)=1-2x(m)$$

$$m=(n+43N^{(2)}_{ID}) \bmod 127$$

$$0 \leq n \leq 127$$

Here, $x(i+7)=(x(i+4)+x(i)) \bmod 2$ and is given as $$[x(6)\ x(5)\ x(4)\ x(3)\ x(2)\ x(1)\ x(0)]=[1\ 1\ 1\ 0\ 1\ 1\ 0]$$

Further, the sequence $d_{SSS}(n)$ of the SSS is as follows.

$$d_{SSS}(n) = [1 - 2x_0((n + m_0) \bmod 127)][1 - 2x_1((n + m_1) \bmod 127)]$$

$$m_0 = 15\left\lfloor \frac{N^{(1)}_{ID}}{112} \right\rfloor + 5N^{(2)}_{ID}$$

$$m_1 = N^{(1)}_{ID} \bmod 112$$

$$0 \leq n < 127$$

Here, $$x_0(i+7)=(x_0(i+4)+x_0(i)) \bmod 2$$

$$x_1(i+7)=(x_1(i+1)+x_1(i)) \bmod 2$$

and is given as $$[x_0(6)\ x_0(5)\ x_0(4)\ x_0(3)\ x_0(2)\ x_0(1)\ x_0(0)]=[0\ 0\ 0\ 0\ 0\ 0\ 1][x_1(6)\ x_1(5)\ x_1(4)\ x_1(3)\ x_1(2)\ x_1(1)\ x_1(0)]=[0\ 0\ 0\ 0\ 0\ 0\ 1]$$

A radio frame with a 10 ms length may be divided into two half frames with a 5 ms length. Referring to FIG. 4B, a description will be made of a slot in which SS/PBCH blocks are transmitted in each half frame. A slot in which the SS/PBCH block is transmitted may be any one of the cases A, B, C, D, and E. In the case A, the subcarrier spacing is 15 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case B, the subcarrier spacing is 30 kHz and the starting time point of the SS/PBCH block is {4, 8, 16, 20}+28*n. In this case, n=0 at a carrier frequency of 3 GHz or less. In addition, it may be n=0, 1 at carrier frequencies above 3 GHz and below 6 GHz. In the case C, the subcarrier spacing is 30 kHz and the starting time point of the SS/PBCH block is the ({2, 8}+14*n)-th symbol. In this case, n=0 or 1 at a carrier frequency of 3 GHz or less. In addition, it may be n=0, 1, 2, 3 at carrier frequencies above 3 GHz and below 6 GHz. In the case D, the subcarrier spacing is 120 kHz and the starting time point of the SS/PBCH block is the ({4, 8, 16, 20}+28*n)-th symbol. In this case, at a carrier frequency of 6 GHz or more, n=0, 1, 2, 3, 5, 6, 7, 8, 10, 11, 12, 13, 15, 16, 17, 18. In the case E, the subcarrier spacing is 240 kHz and the starting time point of the SS/PBCH block is the ({8, 12, 16, 20, 32, 36, 40, 44}+56*n)-th symbol. In this case, at a carrier frequency of 6 GHz or more, n=0, 1, 2, 3, 5, 6, 7, 8.

Figure 5:
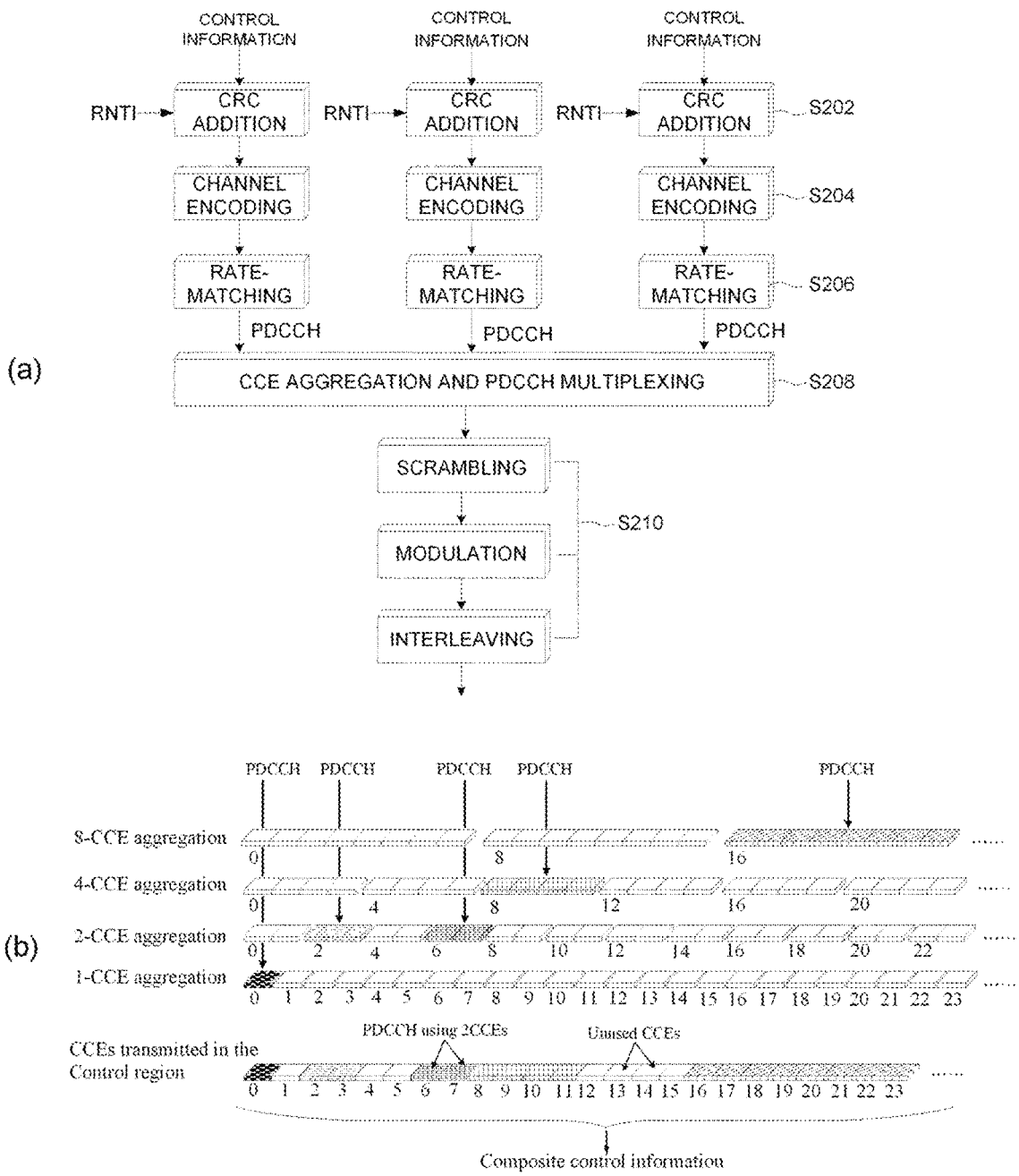
FIG. 5 illustrates a procedure for transmitting control information and a control channel in a 3GPP NR system.

FIG. 5 illustrates a procedure for transmitting control information and a control channel in a 3GPP NR system. Referring to FIG. 5A, the base station may add a cyclic redundancy check (CRC) masked (e.g., an XOR operation) with a radio network temporary identifier (RNTI) to control information (e.g., downlink control information (DCI))

(S202). The base station may scramble the CRC with an RNTI value determined according to the purpose/target of each control information. The common RNTI used by one or more UEs can include at least one of a system information RNTI (SI-RNTI), a paging RNTI (P-RNTI), a random access RNTI (RA-RNTI), and a transmit power control RNTI (TPC-RNTI). In addition, the UE-specific RNTI may include at least one of a cell temporary RNTI (C-RNTI), and the CS-RNTI. Thereafter, the base station may perform rate-matching (S206) according to the amount of resource(s) used for PDCCH transmission after performing channel encoding (e.g., polar coding) (S204). Thereafter, the base station may multiplex the DCI(s) based on the control channel element (CCE) based PDCCH structure (S208). In addition, the base station may apply an additional process (S210) such as scrambling, modulation (e.g., QPSK), interleaving, and the like to the multiplexed DCI(s), and then map the DCI(s) to the resource to be transmitted. The CCE is a basic resource unit for the PDCCH, and one CCE may include a plurality (e.g., six) of resource element groups (REGs). One REG may be configured with a plurality (e.g., 12) of REs. The number of CCEs used for one PDCCH may be defined as an aggregation level. In the 3GPP NR system, an aggregation level of 1, 2, 4, 8, or 16 may be used. FIG. 5B is a diagram related to a CCE aggregation level and the multiplexing of a PDCCH and illustrates the type of a CCE aggregation level used for one PDCCH and CCE(s) transmitted in the control area according thereto.

Figure 6:
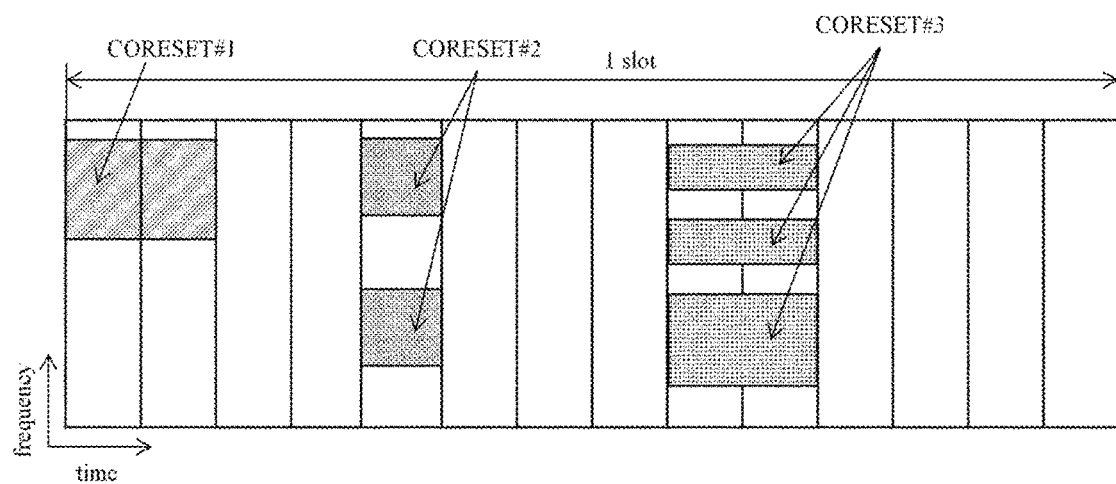
FIG. 6 illustrates a control resource set (CORESET) in which a physical downlink control channel (PUCCH) may be transmitted in a 3GPP NR system.

FIG. 6 illustrates a control resource set (CORESET) in which a physical downlink control channel (PUCCH) may be transmitted in a 3GPP NR system.

The CORESET is a time-frequency resource in which PDCCH, that is, a control signal for the UE, is transmitted. In addition, a search space to be described later may be mapped to one CORESET. Therefore, the UE may monitor the time-frequency domain designated as CORESET instead of monitoring all frequency bands for PDCCH reception, and decode the PDCCH mapped to CORESET. The base station may configure one or more CORESETs for each cell to the UE. The CORESET may be configured with up to three consecutive symbols on the time axis. In addition, the CORESET may be configured in units of six consecutive PRBs on the frequency axis. In the embodiment of FIG. 5, CORESET #1 is configured with consecutive PRBs, and CORESET #2 and CORESET #3 are configured with discontinuous PRBs. The CORESET can be located in any symbol in the slot. For example, in the embodiment of FIG. 5, CORESET #1 starts at the first symbol of the slot, CORESET #2 starts at the fifth symbol of the slot, and CORESET #9 starts at the ninth symbol of the slot.

Figure 7:
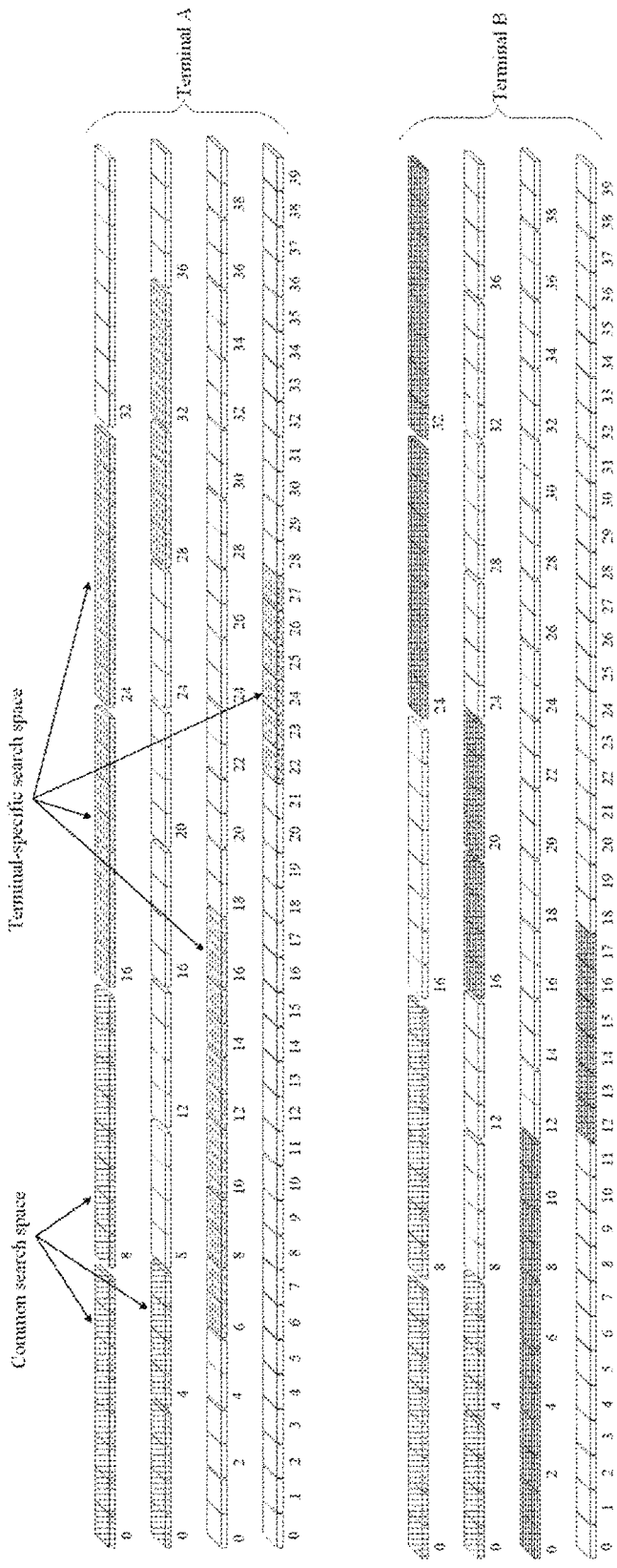
FIG. 7 illustrates a method for configuring a PDCCH search space in a 3GPP NR system.

FIG. 7 illustrates a method for setting a PUCCH search space in a 3GPP NR system. In order to transmit the PDCCH to the UE, each CORESET may have at least one search space. In the embodiment of the present disclosure, the search space is a set of all time-frequency resources (hereinafter, PDCCH candidates) through which the PDCCH of the UE is capable of being transmitted. The search space may include a common search space that the UE of the 3GPP NR is required to commonly search and a UE-specific or a UE-specific search space that a specific UE is required to search. In the common search space, UE may monitor the PDCCH that is set so that all UEs in the cell belonging to the same base station commonly search. In addition, the UE-specific search space may be set for each UE so that UEs monitor the PDCCH allocated to each UE at different search space position according to the UE. In the case of the UE-specific search space, the search space between the UEs may be partially overlapped and allocated due to the limited control area in which the PDCCH may be allocated. Monitoring the PDCCH includes blind decoding for PDCCH candidates in the search space. When the blind decoding is successful, it may be expressed that the PDCCH is (successfully) detected/received and when the blind decoding fails, it may be expressed that the PDCCH is not detected/not received, or is not successfully detected/received.

For convenience of explanation, a PDCCH scrambled with a group common (GC) RNTI previously known to one or more UEs so as to transmit DL control information to the one or more UEs is referred to as a group common (GC) PDCCH or a common PDCCH. In addition, a PDCCH scrambled with a specific-terminal RNTI that a specific UE already knows so as to transmit UL scheduling information or DL scheduling information to the specific UE is referred to as a specific-UE PDCCH. The common PDCCH may be included in a common search space, and the UE-specific PDCCH may be included in a common search space or a UE-specific PDCCH.

The base station may signal each UE or UE group through a PDCCH about information (i.e., DL Grant) related to resource allocation of a paging channel (PCH) and a downlink-shared channel (DL-SCH) that are a transmission channel or information (i.e., UL grant) related to resource allocation of a uplink-shared channel (UL-SCH) and a hybrid automatic repeat request (HARQ). The base station may transmit the PCH transport block and the DL-SCH transport block through the PDSCH. The base station may transmit data excluding specific control information or specific service data through the PDSCH. In addition, the UE may receive data excluding specific control information or specific service data through the PDSCH.

The base station may include, in the PDCCH, information on to which UE (one or a plurality of UEs) PDSCH data is transmitted and how the PDSCH data is to be received and decoded by the corresponding UE, and transmit the PDCCH. For example, it is assumed that the DCI transmitted on a specific PDCCH is CRC masked with an RNTI of "A", and the DCI indicates that PDSCH is allocated to a radio resource (e.g., frequency location) of "B" and indicates transmission format information (e.g., transport block size, modulation scheme, coding information, etc.) of "C". The UE monitors the PDCCH using the RNTI information that the UE has. In this case, if there is a UE which performs blind decoding the PDCCH using the "A" RNTI, the UE receives the PDCCH, and receives the PDSCH indicated by "B" and "C" through the received PDCCH information.

Table 2 shows an embodiment of a physical uplink control channel (PUCCH) used in a wireless communication system.

TABLE 2

| PUCCH format | Length in OFDM symbols | Number of bits |
| --- | --- | --- |
| 0 | 1-2 | ≤2 |
| 1 | 4-14 | ≤2 |
| 2 | 1-2 | >2 |
| 3 | 4-14 | >2 |
| 4 | 4-14 | >2 |

The PUCCH may be used to transmit the following UL control information (UCI).

Scheduling Request (SR): Information used for requesting a UL UL-SCH resource.

HARQ-ACK: A Response to PDCCH (indicating DL SPS release) and/or a response to DL transport block (TB) on PDSCH. HARQ-ACK indicates whether information transmitted on the PDCCH or PDSCH is successfully received. The HARQ-ACK response includes positive ACK (simply ACK), negative ACK (hereinafter NACK), Discontinuous Transmission (DTX), or NACK/DTX. Here, the term HARQ-ACK is used mixed with HARQ-ACK/NACK and ACK/NACK. In general, ACK may be represented by bit value 1 and NACK may be represented by bit value 0.

Channel State Information (CSI): Feedback information on the DL channel. The UE generates it based on the CSI-Reference Signal (RS) transmitted by the base station. Multiple Input Multiple Output (MIMO)-related feedback information includes a Rank Indicator (RI) and a Precoding Matrix Indicator (PMI). CSI can be divided into CSI part 1 and CSI part 2 according to the information indicated by CSI.

In the 3GPP NR system, five PUCCH formats may be used to support various service scenarios, various channel environments, and frame structures.

PUCCH format 0 is a format capable of delivering 1-bit or 2-bit HARQ-ACK information or SR. PUCCH format 0 can be transmitted through one or two OFDM symbols on the time axis and one PRB on the frequency axis. When PUCCH format 0 is transmitted in two OFDM symbols, the same sequence on the two symbols may be transmitted through different RBs. In this case, the sequence may be a sequence cyclic shifted (CS) from a base sequence used in PUCCH format 0. Through this, the UE may obtain a frequency diversity gain. In more detail, the UE may determine a cyclic shift (CS) value $m_{cs}$ according to $M_{bit}$ bit UCI ($M_{bit}=1$ or 2). In addition, the base sequence having the length of 12 may be transmitted by mapping a cyclic shifted sequence based on a predetermined CS value irk s to one OFDM symbol and 12 REs of one RB. When the number of cyclic shifts available to the UE is 12 and $M_{bit}=1$, 1 bit UCI 0 and 1 may be mapped to two cyclic shifted sequences having a difference of 6 in the cyclic shift value, respectively. In addition, when $M_{bit}=2$, 2 bit UCI 00, 01, 11, and 10 may be mapped to four cyclic shifted sequences having a difference of 3 in cyclic shift values, respectively.

PUCCH format 1 may deliver 1-bit or 2-bit HARQ-ACK information or SR. PUCCH format 1 may be transmitted through consecutive OFDM symbols on the time axis and one PRB on the frequency axis. Here, the number of OFDM symbols occupied by PUCCH format 1 may be one of 4 to 14. More specifically, UCI, which is $M_{bit}=1$, may be BPSK-modulated. The UE may modulate UCI, which is $M_{bit}=2$, with quadrature phase shift keying (QPSK). A signal is obtained by multiplying a modulated complex valued symbol d(0) by a sequence of length 12. In this case, the sequence may be a base sequence used for PUCCH format 0. The UE spreads the even-numbered OFDM symbols to which PUCCH format 1 is allocated through the time axis orthogonal cover code (OCC) to transmit the obtained signal. PUCCH format 1 determines the maximum number of different UEs multiplexed in the one RB according to the length of the OCC to be used. A demodulation reference signal (DMRS) may be spread with OCC and mapped to the odd-numbered OFDM symbols of PUCCH format 1.

PUCCH format 2 may deliver UCI exceeding 2 bits. PUCCH format 2 may be transmitted through one or two OFDM symbols on the time axis and one or a plurality of RBs on the frequency axis. When PUCCH format 2 is transmitted in two OFDM symbols, the sequences which are transmitted in different RBs through the two OFDM symbols may be same each other. Here, the sequence may be a plurality of modulated complex valued symbols d(0), . . . , $d(M_{symbol}-1)$. Here, $M_{symbol}$ may be $M_{bit}/2$. Through this, the UE may obtain a frequency diversity gain. More specifically, $M_{bit}$ bit UCI ($M_{bit}>2$) is bit-level scrambled, QPSK modulated, and mapped to RB(s) of one or two OFDM symbol(s). Here, the number of RBs may be one of 1 to 16.

PUCCH format 3 or PUCCH format 4 may deliver UCI exceeding 2 bits. PUCCH format 3 or PUCCH format 4 may be transmitted through consecutive OFDM symbols on the time axis and one PRB on the frequency axis. The number of OFDM symbols occupied by PUCCH format 3 or PUCCH format 4 may be one of 4 to 14. Specifically, the UE modulates $M_{bit}$ bits UCI ($M_{bit}>2$) with π/2-Binary Phase Shift Keying (BPSK) or QPSK to generate a complex valued symbol d(0) to $d(M_{symb}-1)$. Here, when using π/2-BPSK, $M_{symb}=M_{bit}$, and when using QPSK, $M_{symb}=M_{bit}/2$. The UE may not apply block-unit spreading to the PUCCH format 3. However, the UE may apply block-unit spreading to one RB (i.e., 12 subcarriers) using PreDFT-OCC of a length of 12 such that PUCCH format 4 may have two or four multiplexing capacities. The UE performs transmit precoding (or DFT-precoding) on the spread signal and maps it to each RE to transmit the spread signal.

In this case, the number of RBs occupied by PUCCH format 2, PUCCH format 3, or PUCCH format 4 may be determined according to the length and maximum code rate of the UCI transmitted by the UE. When the UE uses PUCCH format 2, the UE may transmit HARQ-ACK information and CSI information together through the PUCCH. When the number of RBs that the UE may transmit is greater than the maximum number of RBs that PUCCH format 2, or PUCCH format 3, or PUCCH format 4 may use, the UE may transmit only the remaining UCI information without transmitting some UCI information according to the priority of the UCI information.

PUCCH format 1, PUCCH format 3, or PUCCH format 4 may be configured through the RRC signal to indicate frequency hopping in a slot. When frequency hopping is configured, the index of the RB to be frequency hopped may be configured with an RRC signal. When PUCCH format 1, PUCCH format 3, or PUCCH format 4 is transmitted through N OFDM symbols on the time axis, the first hop may have floor (N/2) OFDM symbols and the second hop may have ceiling(N/2) OFDM symbols.

PUCCH format 1, PUCCH format 3, or PUCCH format 4 may be configured to be repeatedly transmitted in a plurality of slots. In this case, the number K of slots in which the PUCCH is repeatedly transmitted may be configured by the RRC signal. The repeatedly transmitted PUCCHs must start at an OFDM symbol of the constant position in each slot, and have the constant length. When one OFDM symbol among OFDM symbols of a slot in which a UE should transmit a PUCCH is indicated as a DL symbol by an RRC signal, the UE may not transmit the PUCCH in a corresponding slot and delay the transmission of the PUCCH to the next slot to transmit the PUCCH.

Meanwhile, in the 3GPP NR system, a UE may perform transmission/reception using a bandwidth equal to or less than the bandwidth of a carrier (or cell). For this, the UE may receive the Bandwidth part (BWP) configured with a continuous bandwidth of some of the carrier's bandwidth. A UE operating according to TDD or operating in an unpaired spectrum can receive up to four DL/UL BWP pairs in one carrier (or cell). In addition, the UE may activate one DL/UL BWP pair. A UE operating according to FDD or operating in paired spectrum can receive up to four DL BWPs on a DL carrier (or cell) and up to four UL BWPs on a UL carrier (or cell). The UE may activate one DL BWP and one UL BWP for each carrier (or cell). The UE may not perform reception or transmission in a time-frequency resource other than the activated BWP. The activated BWP may be referred to as an active BWP.

The base station may indicate the activated BWP among the BWPs configured by the UE through downlink control information (DCI). The BWP indicated through the DCI is activated and the other configured BWP(s) are deactivated. In a carrier (or cell) operating in TDD, the base station may include, in the DCI for scheduling PDSCH or PUSCH, a bandwidth part indicator (BPI) indicating the BWP to be activated to change the DL/UL BWP pair of the UE. The UE may receive the DCI for scheduling the PDSCH or PUSCH and may identify the DL/UL BWP pair activated based on the BPI. For a DL carrier (or cell) operating in an FDD, the base station may include a BPI indicating the BWP to be activated in the DCI for scheduling PDSCH so as to change the DL BWP of the UE. For a UL carrier (or cell) operating in an FDD, the base station may include a BPI indicating the BWP to be activated in the DCI for scheduling PUSCH so as to change the UL BWP of the UE.

Figure 8:
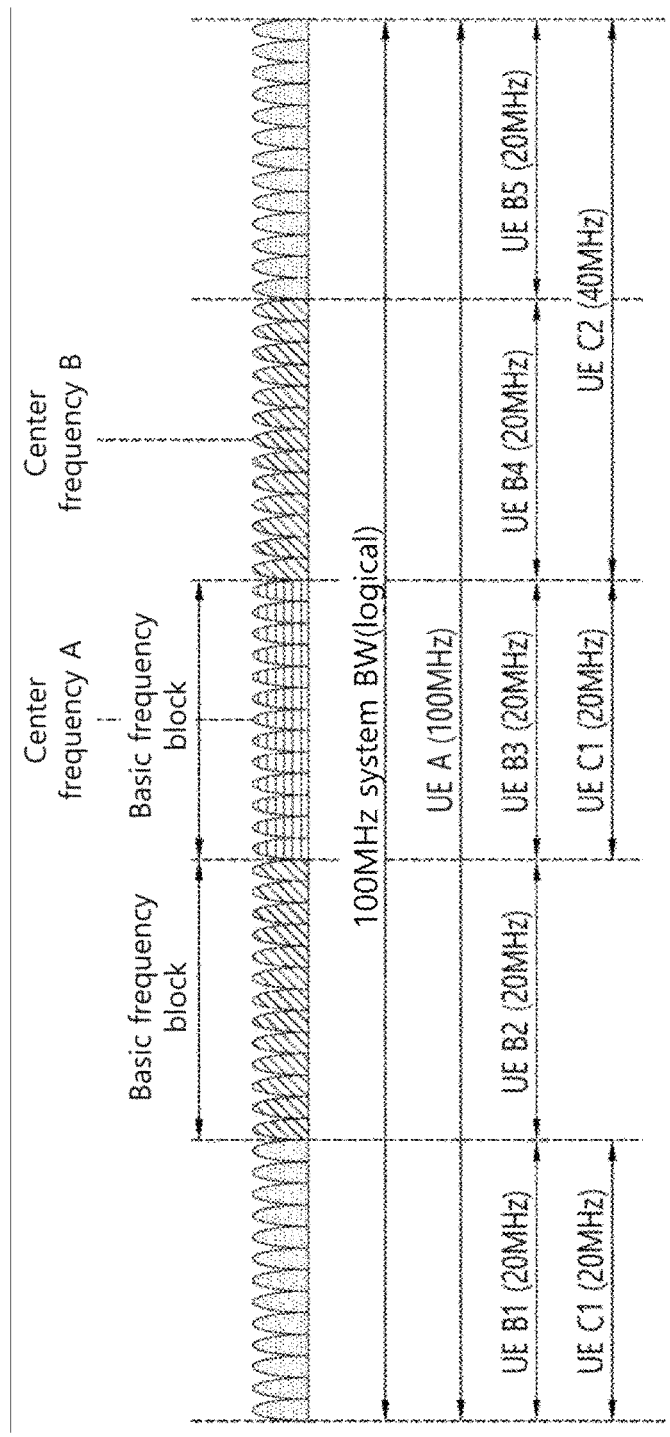
FIG. 8 is a conceptual diagram illustrating carrier aggregation.

FIG. 8 is a conceptual diagram illustrating carrier aggregation.

The carrier aggregation is a method in which the UE uses a plurality of frequency blocks or cells (in the logical sense) configured with UL resources (or component carriers) and/or DL resources (or component carriers) as one large logical frequency band in order for a wireless communication system to use a wider frequency band. One component carrier may also be referred to as a term called a Primary cell (PCell) or a Secondary cell (SCell), or a Primary SCell (PScell). However, hereinafter, for convenience of description, the term "component carrier" is used.

Referring to FIG. 8, as an example of a 3GPP NR system, the entire system band may include up to 16 component carriers, and each component carrier may have a bandwidth of up to 400 MHz. The component carrier may include one or more physically consecutive subcarriers. Although it is shown in FIG. 8 that each of the component carriers has the same bandwidth, this is merely an example, and each component carrier may have a different bandwidth. Also, although each component carrier is shown as being adjacent to each other in the frequency axis, the drawings are shown in a logical concept, and each component carrier may be physically adjacent to one another, or may be spaced apart.

Different center frequencies may be used for each component carrier. Also, one common center frequency may be used in physically adjacent component carriers. Assuming that all the component carriers are physically adjacent in the embodiment of FIG. 8, center frequency A may be used in all the component carriers. Further, assuming that the respective component carriers are not physically adjacent to each other, center frequency A and the center frequency B can be used in each of the component carriers.

When the total system band is extended by carrier aggregation, the frequency band used for communication with each UE can be defined in units of a component carrier. UE A may use 100 MHz, which is the total system band, and performs communication using all five component carriers. UEs $B_1$~$B_5$ can use only a 20 MHz bandwidth and perform communication using one component carrier. UEs $C_1$ and $C_2$ may use a 40 MHz bandwidth and perform communication using two component carriers, respectively. The two component carriers may be logically/physically adjacent or non-adjacent. UE $C_1$ represents the case of using two non-adjacent component carriers, and UE $C_2$ represents the case of using two adjacent component carriers.

Figure 9:
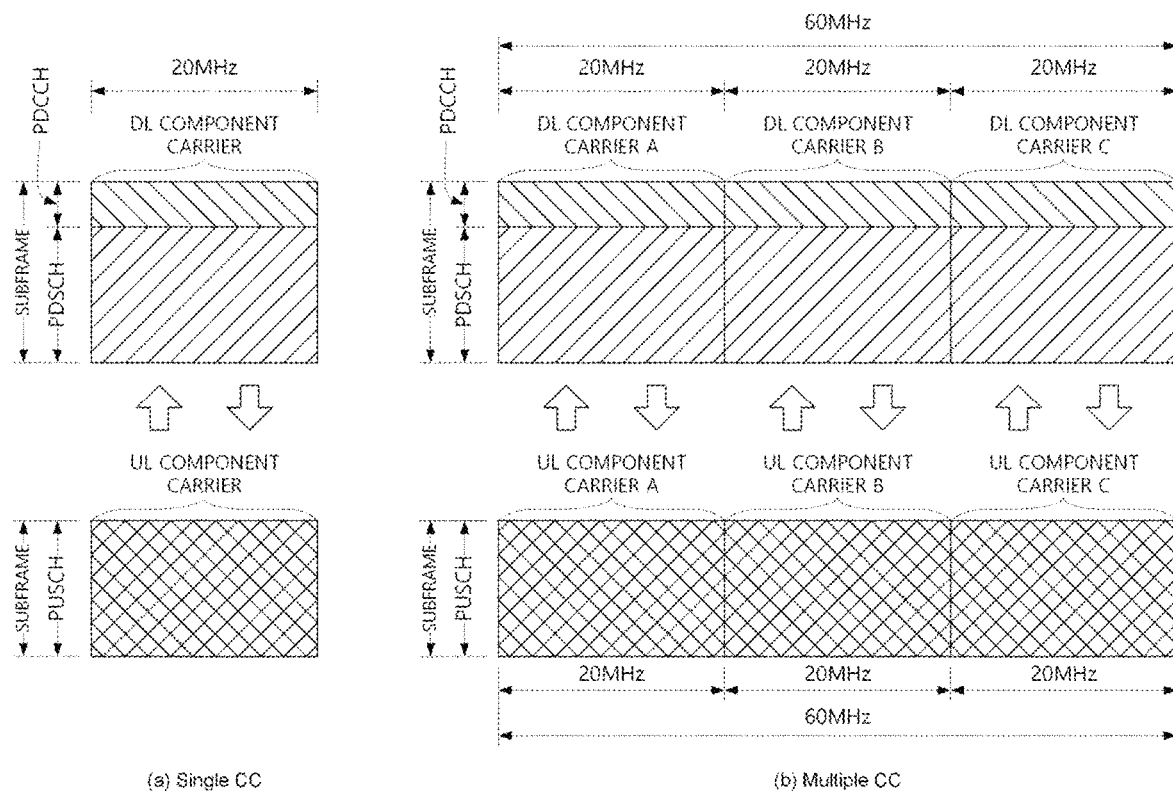
FIG. 9 is a diagram for explaining signal carrier communication and multiple carrier communication.

FIG. 9 is a drawing for explaining signal carrier communication and multiple carrier communication. Particularly, FIG. 9A shows a single carrier subframe structure and FIG. 9B shows a multi-carrier subframe structure.

Referring to FIG. 9A, in an FDD mode, a general wireless communication system may perform data transmission or reception through one DL band and one UL band corresponding thereto. In another specific embodiment, in a TDD mode, the wireless communication system may divide a radio frame into a UL time unit and a DL time unit in a time domain, and perform data transmission or reception through a UL/DL time unit. Referring to FIG. 9B, three 20 MHz component carriers (CCs) can be aggregated into each of UL and DL, so that a bandwidth of 60 MHz can be supported. Each CC may be adjacent or non-adjacent to one another in the frequency domain. FIG. 9B shows a case where the bandwidth of the UL CC and the bandwidth of the DL CC are the same and symmetric, but the bandwidth of each CC can be determined independently. In addition, asymmetric carrier aggregation with different number of UL CCs and DL CCs is possible. A DL/UL CC allocated/configured to a specific UE through RRC may be called as a serving DL/UL CC of the specific UE.

The base station may perform communication with the UE by activating some or all of the serving CCs of the UE or deactivating some CCs. The base station can change the CC to be activated/deactivated, and change the number of CCs to be activated/deactivated. If the base station allocates a CC available for the UE as to be cell-specific or UE-specific, at least one of the allocated CCs can be deactivated, unless the CC allocation for the UE is completely reconfigured or the UE is handed over. One CC that is not deactivated by the UE is called as a Primary CC (PCC) or a primary cell (PCell), and a CC that the base station can freely activate/deactivate is called as a Secondary CC (SCC) or a secondary cell (SCell).

Meanwhile, 3GPP NR uses the concept of a cell to manage radio resources. A cell is defined as a combination of DL resources and UL resources, that is, a combination of DL CC and UL CC. A cell may be configured with DL resources alone, or a combination of DL resources and UL resources. When the carrier aggregation is supported, the linkage between the carrier frequency of the DL resource (or DL CC) and the carrier frequency of the UL resource (or UL CC) may be indicated by system information. The carrier frequency refers to the center frequency of each cell or CC. A cell corresponding to the PCC is referred to as a PCell, and a cell corresponding to the SCC is referred to as an SCell. The carrier corresponding to the PCell in the DL is the DL PCC, and the carrier corresponding to the PCell in the UL is the UL PCC. Similarly, the carrier corresponding to the SCell in the DL is the DL SCC and the carrier corresponding to the SCell in the UL is the UL SCC. According to UE capability, the serving cell(s) may be configured with one PCell and zero or more SCells. In the case of UEs that are in the RRC_CONNECTED state but not configured for carrier aggregation or that do not support carrier aggregation, there is only one serving cell configured only with PCell.

As mentioned above, the term "cell" used in carrier aggregation is distinguished from the term "cell" which refers to a certain geographical area in which a communication service is provided by one base station or one antenna group. That is, one component carrier may also be referred to as a scheduling cell, a scheduled cell, a primary cell (PCell), a secondary cell (SCell), or a primary SCell (PScell). However, in order to distinguish between a cell referring to a certain geographical area and a cell of carrier aggregation, in the present disclosure, a cell of a carrier aggregation is referred to as a CC, and a cell of a geographical area is referred to as a cell.

Figure 10:
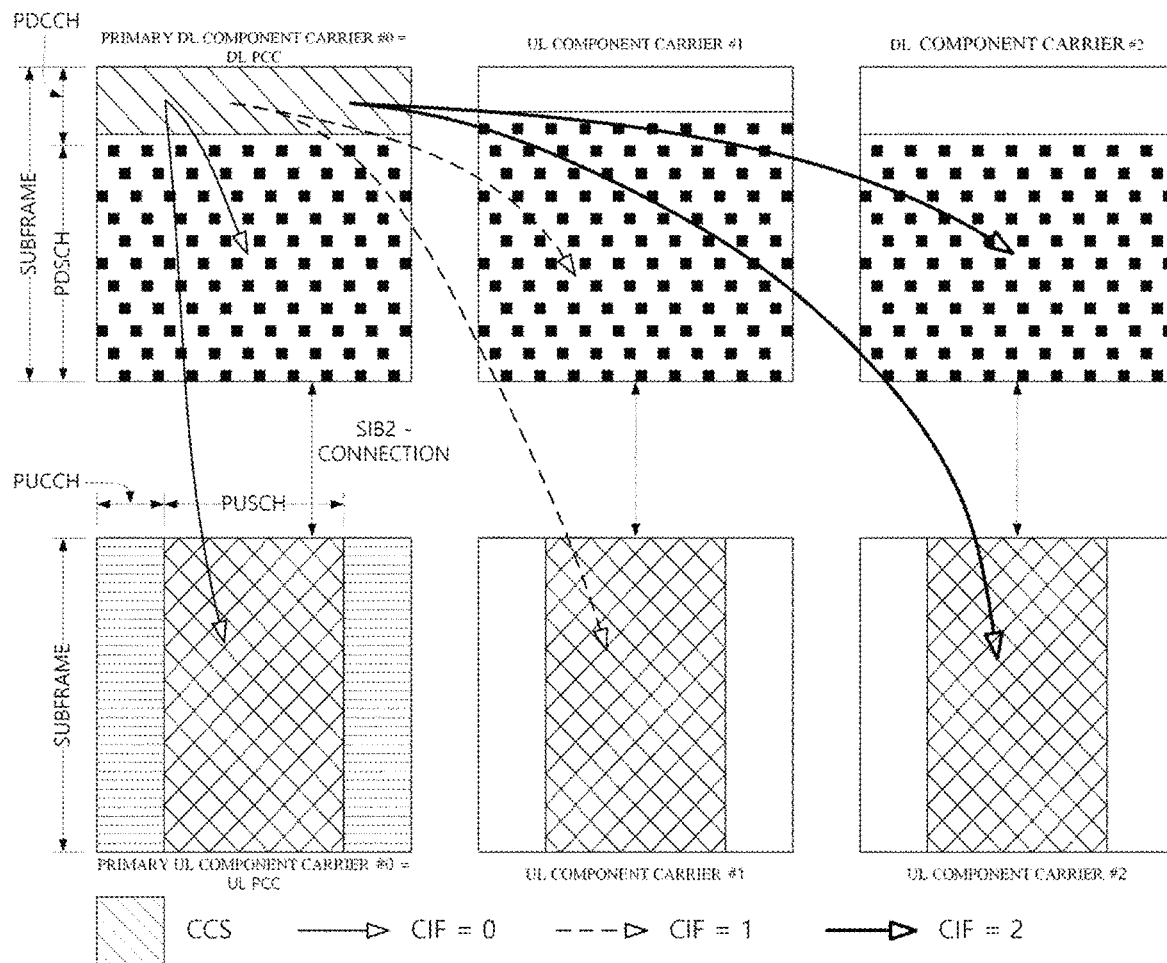
FIG. 10 is a diagram showing an example in which a cross carrier scheduling technique is applied.

FIG. 10 is a diagram showing an example in which a cross carrier scheduling technique is applied. When cross carrier scheduling is set, the control channel transmitted through the first CC may schedule a data channel transmitted through the first CC or the second CC using a carrier indicator field (CIF). The CIF is included in the DCI. In other words, a scheduling cell is set, and the DL grant/UL grant transmitted in the PDCCH area of the scheduling cell schedules the PDSCH/PUSCH of the scheduled cell. That is, a search area for the plurality of component carriers exists in the PDCCH area of the scheduling cell. A PCell may be basically a scheduling cell, and a specific SCell may be designated as a scheduling cell by an upper layer.

In the embodiment of FIG. 10, it is assumed that three DL CCs are merged. Here, it is assumed that DL component carrier #0 is DL PCC (or PCell), and DL component carrier #1 and DL component carrier #2 are DL SCCs (or SCell). In addition, it is assumed that the DL PCC is set to the PDCCH monitoring CC. When cross-carrier scheduling is not configured by UE-specific (or UE-group-specific or cell-specific) higher layer signaling, a CIF is disabled, and each DL CC can transmit only a PDCCH for scheduling its PDSCH without the CIF according to an NR PDCCH rule (non-cross-carrier scheduling, self-carrier scheduling). Meanwhile, if cross-carrier scheduling is configured by UE-specific (or UE-group-specific or cell-specific) higher layer signaling, a CIF is enabled, and a specific CC (e.g., DL PCC) may transmit not only the PDCCH for scheduling the PDSCH of the DL CC A using the CIF but also the PDCCH for scheduling the PDSCH of another CC (cross-carrier scheduling). On the other hand, a PDCCH is not transmitted in another DL CC. Accordingly, the UE monitors the PDCCH not including the CIF to receive a self-carrier scheduled PDSCH depending on whether the cross-carrier scheduling is configured for the UE, or monitors the PDCCH including the CIF to receive the cross-carrier scheduled PDSCH.

On the other hand, FIGS. 9 and 10 illustrate the subframe structure of the 3GPP LTE-A system, and the same or similar configuration may be applied to the 3GPP NR system. However, in the 3GPP NR system, the subframes of FIGS. 9 and 10 may be replaced with slots.

Figure 11:
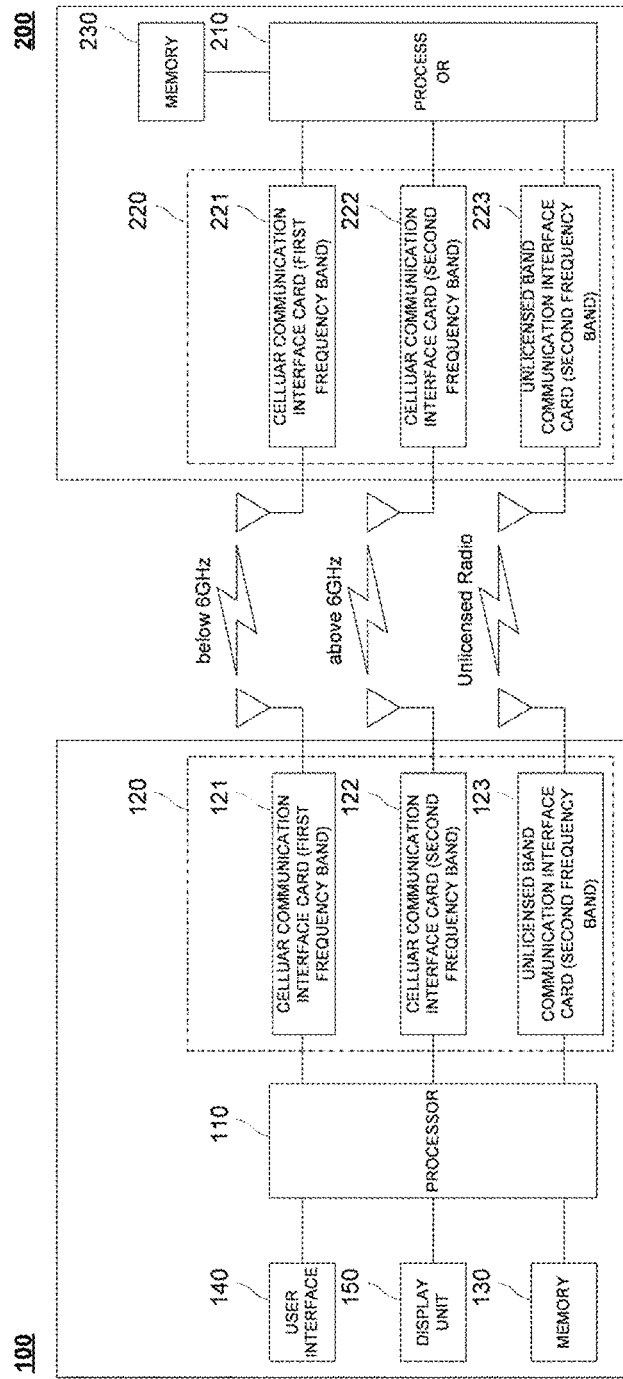
FIG. 11 is a block diagram showing the configurations of a UE and a base station according to an embodiment of the present invention.

FIG. 11 is a block diagram showing the configurations of a UE and a base station according to an embodiment of the present disclosure. In an embodiment of the present disclosure, the UE may be implemented with various types of wireless communication devices or computing devices that are guaranteed to be portable and mobile. The UE may be referred to as a User Equipment (UE), a Station (STA), a Mobile Subscriber (MS), or the like. In addition, in an embodiment of the present disclosure, the base station controls and manages a cell (e.g., a macro cell, a femto cell, a pico cell, etc.) corresponding to a service area, and performs functions of a signal transmission, a channel designation, a channel monitoring, a self diagnosis, a relay, or the like. The base station may be referred to as next Generation NodeB (gNB) or Access Point (AP).

As shown in the drawing, a UE 100 according to an embodiment of the present disclosure may include a processor 110, a communication module 120, a memory 130, a user interface 140, and a display unit 150.

First, the processor 110 may execute various instructions or programs and process data within the UE 100. In addition, the processor 110 may control the entire operation including each unit of the UE 100, and may control the transmission/reception of data between the units. Here, the processor 110 may be configured to perform an operation according to the embodiments described in the present disclosure. For example, the processor 110 may receive slot configuration information, determine a slot configuration based on the slot configuration information, and perform communication according to the determined slot configuration.

Next, the communication module 120 may be an integrated module that performs wireless communication using a wireless communication network and a wireless LAN access using a wireless LAN. For this, the communication module 120 may include a plurality of network interface cards (NICs) such as cellular communication interface cards 121 and 122 and an unlicensed band communication interface card 123 in an internal or external form. In the drawing, the communication module 120 is shown as an integral integration module, but unlike the drawing, each network interface card can be independently arranged according to a circuit configuration or usage.

The cellular communication interface card 121 may transmit or receive a radio signal with at least one of the base station 200, an external device, and a server by using a mobile communication network and provide a cellular communication service in a first frequency band based on the instructions from the processor 110. According to an embodiment, the cellular communication interface card 121 may include at least one NIC module using a frequency band of less than 6 GHz. At least one NIC module of the cellular communication interface card 121 may independently perform cellular communication with at least one of the base station 200, an external device, and a server in accordance with cellular communication standards or protocols in the frequency bands below 6 GHz supported by the corresponding NIC module.

The cellular communication interface card 122 may transmit or receive a radio signal with at least one of the base station 200, an external device, and a server by using a mobile communication network and provide a cellular communication service in a second frequency band based on the instructions from the processor 110. According to an embodiment, the cellular communication interface card 122 may include at least one NIC module using a frequency band of more than 6 GHz. At least one NIC module of the cellular communication interface card 122 may independently perform cellular communication with at least one of the base station 200, an external device, and a server in accordance with cellular communication standards or protocols in the frequency bands of 6 GHz or more supported by the corresponding NIC module.

The unlicensed band communication interface card 123 transmits or receives a radio signal with at least one of the base station 200, an external device, and a server by using a third frequency band which is an unlicensed band, and provides an unlicensed band communication service based on the instructions from the processor 110. The unlicensed band communication interface card 123 may include at least one NIC module using an unlicensed band. For example, the unlicensed band may be a band of 2.4 GHz or 5 GHz. At least one NIC module of the unlicensed band communication interface card 123 may independently or dependently perform wireless communication with at least one of the base station 200, an external device, and a server according to the unlicensed band communication standard or protocol of the frequency band supported by the corresponding NIC module.

The memory 130 stores a control program used in the UE 100 and various kinds of data therefor. Such a control program may include a prescribed program required for performing wireless communication with at least one among the base station 200, an external device, and a server.

Next, the user interface 140 includes various kinds of input/output means provided in the UE 100. In other words, the user interface 140 may receive a user input using various input means, and the processor 110 may control the UE 100 based on the received user input. In addition, the user interface 140 may perform an output based on instructions from the processor 110 using various kinds of output means.

Next, the display unit 150 outputs various images on a display screen. The display unit 150 may output various display objects such as content executed by the processor 110 or a user interface based on control instructions from the processor 110.

In addition, the base station 200 according to an embodiment of the present disclosure may include a processor 210, a communication module 220, and a memory 230.

First, the processor 210 may execute various instructions or programs, and process internal data of the base station 200. In addition, the processor 210 may control the entire operations of units in the base station 200, and control data transmission and reception between the units. Here, the processor 210 may be configured to perform operations according to embodiments described in the present disclosure. For example, the processor 210 may signal slot configuration and perform communication according to the signaled slot configuration.

Next, the communication module 220 may be an integrated module that performs wireless communication using a wireless communication network and a wireless LAN access using a wireless LAN. For this, the communication module 120 may include a plurality of network interface cards such as cellular communication interface cards 221 and 222 and an unlicensed band communication interface card 223 in an internal or external form. In the drawing, the communication module 220 is shown as an integral integration module, but unlike the drawing, each network interface card can be independently arranged according to a circuit configuration or usage.

The cellular communication interface card 221 may transmit or receive a radio signal with at least one of the base station 100, an external device, and a server by using a mobile communication network and provide a cellular communication service in the first frequency band based on the instructions from the processor 210. According to an embodiment, the cellular communication interface card 221 may include at least one NIC module using a frequency band of less than 6 GHz. The at least one NIC module of the cellular communication interface card 221 may independently perform cellular communication with at least one of the base station 100, an external device, and a server in accordance with the cellular communication standards or protocols in the frequency bands less than 6 GHz supported by the corresponding NIC module.

The cellular communication interface card 222 may transmit or receive a radio signal with at least one of the base station 100, an external device, and a server by using a mobile communication network and provide a cellular communication service in the second frequency band based on the instructions from the processor 210. According to an embodiment, the cellular communication interface card 222 may include at least one NIC module using a frequency band of 6 GHz or more. The at least one NIC module of the cellular communication interface card 222 may independently perform cellular communication with at least one of the base station 100, an external device, and a server in accordance with the cellular communication standards or protocols in the frequency bands 6 GHz or more supported by the corresponding NIC module.

The unlicensed band communication interface card 223 transmits or receives a radio signal with at least one of the base station 100, an external device, and a server by using the third frequency band which is an unlicensed band, and provides an unlicensed band communication service based on the instructions from the processor 210. The unlicensed band communication interface card 223 may include at least one NIC module using an unlicensed band. For example, the unlicensed band may be a band of 2.4 GHz or 5 GHz. At least one NIC module of the unlicensed band communication interface card 223 may independently or dependently perform wireless communication with at least one of the base station 100, an external device, and a server according to the unlicensed band communication standards or protocols of the frequency band supported by the corresponding NIC module.

FIG. 11 is a block diagram illustrating the UE 100 and the base station 200 according to an embodiment of the present disclosure, and blocks separately shown are logically divided elements of a device. Accordingly, the aforementioned elements of the device may be mounted in a single chip or a plurality of chips according to the design of the device. In addition, a part of the configuration of the UE 100, for example, a user interface 140, a display unit 150 and the like may be selectively provided in the UE 100. In addition, the user interface 140, the display unit 150 and the like may be additionally provided in the base station 200, if necessary.

The base station may specify the type of each symbol as one of an uplink symbol, a downlink symbol, and a flexible symbol. In this case, the type of symbol represents the purpose of the symbol. The base station may configure the type of each symbol through system information block 1 (SIB1). Configuring the type of each symbol in the above manner is called "semi-static slot configuration". The UE may perform transmission or reception based on the type of symbol configured for the UE by the base station. The symbol that is configured as a flexible symbol for the UE according to the semi-static slot configuration may be specified as one of an uplink symbol, a downlink symbol, and a flexible symbol through dynamic slot format information (SFI) transmitted through a PDCCH. The UE may not expect to receive downlink transmission in the symbol indicated as an uplink symbol by the semi-static slot configuration and the dynamic SFI. The UE may not expect uplink transmission to be scheduled in the symbol indicated as a downlink symbol by the semi-static slot configuration and the dynamic SFI. The UE may not expect that reception of downlink transmission or uplink transmission is scheduled in the symbol indicated as a flexible symbol by the dynamic SFI. In addition, the symbol configured as a downlink symbol or an uplink symbol by an RRC signal may not be allowed to change to another symbol type.

The UE may monitor a PDCCH including the dynamic SFI in every regular monitoring cycle. Specifically, DCI includes the dynamic SFI, and the PDCCH includes the DCI. In this case, the monitoring cycle may be configured by the base station. The UE may perform blind decoding in order to receive the PDCCH in every monitoring cycle. If the UE fails to receive the PDCCH, the UE is unable to determine whether the flexible symbol specified in the semi-static slot configuration is an uplink symbol, a downlink symbol, or a flexible symbol. If the UE fails to receive the PDCCH, the UE may perform a different operation from that in the case where dynamic SFI is obtained through the PDCCH.

The base station may configure a slot format combination capable of being indicated by the dynamic SFI using an RRC signal. The slot format combination may be defined by a slot format index. The slot format index indicates a slot format that represents the type of symbol included in one slot. The slot format combination configured through the RRC signal may represent the slot format of one slot. In addition, the slot format combination configured through the RRC signal may represent the slot formats of a plurality of slots. The respective slots may be assigned with the slot formats shown in Table 3.

TABLE 3

| | Symbol number in a slot | | | | | | | | | | | | | |
|---|---|---|---|---|---|---|---|---|---|---|---|---|---|---|
| index | 0 | 1 | 2 | 3 | 4 | 5 | 6 | 7 | 8 | 9 | 10 | 11 | 12 | 13 |
| 0 | D | D | D | D | D | D | D | D | D | D | D | D | D | D |
| 1 | U | U | U | U | U | U | U | U | U | U | U | U | U | U |
| 2 | X | X | X | X | X | X | X | X | X | X | X | X | X | X |
| 3 | D | D | D | D | D | D | D | D | D | D | D | D | D | X |
| 4 | D | D | D | D | D | D | D | D | D | D | D | D | X | X |
| 5 | D | D | D | D | D | D | D | D | D | D | D | X | X | X |
| 6 | D | D | D | D | D | D | D | D | D | D | X | X | X | X |
| 7 | D | D | D | D | D | D | D | D | D | X | X | X | X | X |
| 8 | X | X | X | X | X | X | X | X | X | X | X | X | X | U |
| 9 | X | X | X | X | X | X | X | X | X | X | X | X | U | U |
| 10 | X | U | U | U | U | U | U | U | U | U | U | U | U | U |
| 11 | X | X | U | U | U | U | U | U | U | U | U | U | U | U |
| 12 | X | X | X | U | U | U | U | U | U | U | U | U | U | U |
| 13 | X | X | X | X | U | U | U | U | U | U | U | U | U | U |
| 14 | X | X | X | X | X | U | U | U | U | U | U | U | U | U |
| 15 | X | X | X | X | X | X | U | U | U | U | U | U | U | U |
| 16 | D | X | X | X | X | X | X | X | X | X | X | X | X | X |
| 17 | D | D | X | X | X | X | X | X | X | X | X | X | X | X |
| 18 | D | D | D | X | X | X | X | X | X | X | X | X | X | X |
| 19 | D | X | X | X | X | X | X | X | X | X | X | X | X | U |
| 20 | D | D | X | X | X | X | X | X | X | X | X | X | X | U |
| 21 | D | D | D | X | X | X | X | X | X | X | X | X | X | U |
| 22 | D | X | X | X | X | X | X | X | X | X | X | X | U | U |
| 23 | D | D | X | X | X | X | X | X | X | X | X | X | U | U |
| 24 | D | D | D | X | X | X | X | X | X | X | X | X | U | U |
| 25 | D | X | X | X | X | X | X | X | X | X | X | U | U | U |
| 26 | D | D | X | X | X | X | X | X | X | X | X | U | U | U |
| 27 | D | D | D | X | X | X | X | X | X | X | X | U | U | U |
| 28 | D | D | D | D | D | D | D | D | D | D | D | X | X | U |
| 29 | D | D | D | D | D | D | D | D | D | D | X | X | X | U |
| 30 | D | D | D | D | D | D | D | D | D | X | X | X | X | U |
| 31 | D | D | D | D | D | D | D | D | D | D | D | X | U | U |
| 32 | D | D | D | D | D | D | D | D | D | D | X | X | U | U |
| 33 | D | D | D | D | D | D | D | D | D | X | X | X | U | U |
| 34 | D | X | U | U | U | U | U | U | U | U | U | U | U | U |
| 35 | D | D | X | U | U | U | U | U | U | U | U | U | U | U |
| 36 | D | D | D | X | U | U | U | U | U | U | U | U | U | U |
| 37 | D | X | X | U | U | U | U | U | U | U | U | U | U | U |
| 38 | D | D | X | X | U | U | U | U | U | U | U | U | U | U |
| 39 | D | D | D | X | X | U | U | U | U | U | U | U | U | U |
| 40 | D | X | X | X | U | U | U | U | U | U | U | U | U | U |
| 41 | D | D | X | X | X | U | U | U | U | U | U | U | U | U |
| 42 | D | D | D | X | X | X | U | U | U | U | U | U | U | U |
| 43 | D | D | D | D | D | D | D | D | D | X | X | X | X | U |
| 44 | D | D | D | D | D | X | X | X | X | X | X | U | U | U |
| 45 | D | D | D | D | D | X | X | U | U | U | U | U | U | U |
| 46 | D | D | D | D | X | U | D | D | D | D | X | U | U | U |
| 47 | D | D | X | U | U | U | U | D | D | X | U | U | U | U |
| 48 | D | X | U | U | U | U | U | D | X | U | U | U | U | U |
| 49 | D | D | D | X | X | U | U | D | D | D | X | X | U | U |
| 50 | D | D | X | X | U | U | U | D | D | X | X | U | U | U |
| 51 | D | X | X | U | U | U | U | D | X | X | U | U | U | U |
| 52 | D | X | X | X | X | X | U | D | X | X | X | X | X | U |
| 53 | D | D | X | X | X | X | U | D | D | X | X | X | X | U |
| 54 | X | X | X | X | X | X | X | D | D | D | D | D | D | D |
| 55 | D | D | X | X | X | U | U | U | D | D | D | D | D | D |
| 56~255 | | | | | | | Reserved | | | | | | | |

In Table 3, "D" represents a downlink symbol, "U" represents an uplink symbol, and "X" represents a flexible symbol. As shown in Table 3, up to two DL/UL switchings may be allowed within one slot.

As described above, the base station may configure a slot format of one slot or slot formats of a plurality of slots using the dynamic SFI. The value of the dynamic SFI may indicate the entry representing a combination of specific slot formats. In this case, the entry may be referred to as a "slot format combination index". The slot format of one slot or the slot formats of a plurality of slots indicated by the dynamic SFI may be referred to as a "slot format combination". That is, the slot format combination indicates the types of symbols included in one or more slots. The UE may determine the slot configuration configured for the UE based on the dynamic SFI. When the slot format combination indicated by the value of the dynamic SFI is different from the slot format combination that is previously configured for the UE, the UE may determine that the slot format combination configured for the UE has been changed.

Specifically, the slot format combination capable of being indicated by the dynamic SFI configured as an RRC signal may indicate the slot format of one slot or the slot formats of a plurality of slots. To this end, as shown in Table 4, the base station may configure a slot format combination for the slot format of one slot or a plurality of slots in Table 3. In Table 4, the slot format combination index 0 of the dynamic SFI may indicate the slot format of one slot Slot #0, and the slot format of the corresponding slot Slot #0 may be configured as the slot format corresponding to the slot format index value "4". Referring to Table 3, the index 4 of the slot format combination represents slot formats {D, D, D, D, D, D, D, D, D, D, D, D, X, X} corresponding to the slot format index value "4" in Table 3. In Table 4, the slot format combination index value 1 of the dynamic SFI represents the slot formats of two slots Slot #0 and Slot #1. The first slot Slot #0 follows the slot format corresponding to the slot format index value "31", and the second slot Slot #1 is configured as the slot format corresponding to the slot format index value "10". The slot formats corresponding to the index value "31" are {D, D, D, D, D, D, D, D, D, D, D, X, U, U}, and the slot formats corresponding to the index value "10" are {X, U, U, U, U, U, U, U, U, U, U, U, U, U} in Table 3. As described above, the base station may configure the slot format combination for the UE through the dynamic SFI. In this case, the dynamic SFI represents the slot format combination index indicating the slot format combination. The base station may configure the slot format combination capable of being indicated by the dynamic SFI through the RRC configuration. The UE may receive the dynamic SFI, and may obtain the slot format combination index indicated by the dynamic SFI. The UE may determine that the slot format has been configured for the UE according to the slot format combination corresponding to the obtained slot format combination index.

TABLE 4

| Index | Slot#0 | Slot#1 | Slot#2 | ... | Slot#255 |
|---|---|---|---|---|---|
| 0 | 4 | — | — | — | — |
| 1 | 31 | 10 | — | — | — |
| 2 | 12 | 8 | 7 | — | — |
| 3 | 17 | 5 | 5 | ... | 10 |
| ... | | | | | |
| 4095 | 11 | 20 | 55 | ... | 1 |

The UE may determine the number of dynamic SFI bits to be monitored by the UE based on the number of slot format combinations that the base station is able to indicate through the dynamic SFI. The UE may determine the number of dynamic SFI bits to be monitored by the UE to be $\mathrm{ceil}(\log_2(N))$. In this case, "N" is the number of slot format combinations that the base station is able to indicate through the dynamic SFI. In addition, ceil(x) represents the smallest number among the integers equal to or greater than "x". If the number of the slot format combinations that the base station is able to indicate through the dynamic SFI is 1, the operation of the UE may be problematic. For example, if the number of slot format combinations that the base station is able to indicate through the dynamic SFI is 1, the number of dynamic SFI bits to be monitored by the UE may be determined to be 0. In this case, since the number of pieces of dynamic SFI is 0, the UE is unable to monitor a PDCCH transmitting the dynamic SFI. Accordingly, there may be a problem in which the UE is unable to perform an operation according to the success or failure of reception of the dynamic SFI.

In an embodiment of the present disclosure, if the number of slot format combinations that the base station is able to indicate through the dynamic SFI is 1, the UE may determine that the number of dynamic SFI bits to be monitored by the UE is 1. If the number of slot format combinations that the base station is able to indicate through the dynamic SFI is greater than 1, the UE may determine the number of dynamic SFI bits to be monitored by the UE to be $\mathrm{ceil}(\log_2(N/2))+1$. Here, "N" is the number of slot format combinations that the base station is able to indicate through the dynamic SFI. In addition, ceil(x) represents the smallest number among the integers equal to or greater than "x". In addition, regardless of the number of slot format combinations that the base station is able to indicate through the dynamic SFI, the UE may determine that the number of dynamic SFI bits to be monitored by the UE is $\mathrm{ceil}(\log_2(N/2))+1$. In addition, regardless of the number of slot format combinations that the base station is able to indicate through the dynamic SFI, the UE may determine that the number of dynamic SFI bits to be monitored by the UE is $\max(\mathrm{ceil}(\log_2(N)), 1)$. Here, max(a, b) represents the larger value of "a" and "b". In this embodiment, the number of dynamic SFI bits according to the number of slot format combinations of the UE may be shown in Table 5. According to Table 5, $\mathrm{ceil}(\log_2(N/2))+1$ and $\max(\mathrm{ceil}(\log_2(N)), 1)$ described above represent the same number of dynamic SFI bits. If the number of slot format combinations is 1, the number of dynamic SFI bits is 1. Accordingly, the UE may expect that at least one bit of dynamic SFI is to be transmitted, and may monitor the PDCCH in which the dynamic SFI is transmitted.

TABLE 5

| Number of slot format combinations | | 1 | 2 | 3 | 4 | 5 | ... | N > 0 |
|---|---|---|---|---|---|---|---|---|
| Number of dynamic SFI bits | ceil(log₂(N)) | 0 | 1 | 2 | 2 | 3 | ... | ceil(log₂(N)) |
| | 1 if number of slot format combinations is 1, otherwise ceil(log₂(N/2)) + 1 | 1 | 1 | 2 | 2 | 3 | ... | ceil(log₂(N/2)) + 1 |
| | max(ceil(log₂(N)), 1) | 1 | 1 | 2 | 2 | 3 | ... | ceil(log₂(N)) |

When the number of slot format combinations that the base station is able to indicate through the dynamic SFI is 1, the UE may operate as follows, depending on the value of the dynamic SFI. When the value of the dynamic SFI is 0, the UE may determine that the slot has been configured according to the entry of one slot format combination configured for the UE through an RRC signal by the base station. In addition, the UE may not expect that the value of the dynamic SFI is 1. Specifically, when the value of the dynamic SFI is 1, the UE may ignore the dynamic SFI. Specifically, if the value of the dynamic SFI is 1, the UE may determine that the dynamic SFI corresponds to an error. In another specific embodiment, when the value of the dynamic SFI is 1, the UE may perform operations corresponding to the case in which the PDCCH including the dynamic SFI fails to be received. In another specific embodiment, when the value of the dynamic SFI is 1, the UE may cancel transmission and reception of all semi-static RRC-configured measurement signals. The RRC-configured measurement signal may include at least one of CSI-RS measurement, periodic SRS transmission, and PDCCH monitoring.

In another embodiment of the present invention, the UE may not expect that the number of slot format combinations that the base station is able to indicate through dynamic SFI is 1. In this case, the UE may determine that the number of dynamic SFI bits to be monitored by the UE is $\mathrm{ceil}(\log_2 N)$. Here, "N" is the number of slot format combinations that the base station is able to indicate through the dynamic SFI. In addition, ceil(x) represents the smallest number among the integers equal to or greater than "x".

In another embodiment of the present invention, when the number of slot format combinations that the base station is able to indicate through the dynamic SFI is 1, the UE may determine that the number of dynamic SFI bits to be monitored by the UE is 0. In this case, the UE may not monitor the PDCCH including the dynamic SFI. The UE may not monitor the PDCCH including the dynamic SFI, and may determine that the slot has been configured according to the entry of one slot format combination configured for the UE through an RRC signal by the base station.

In the above-described embodiments, the UE may determine the length of the dynamic SFI based on the maximum value of the slot format combination indexes capable of being indicated by the dynamic SFI that is transmitted to the UE. For the convenience of description, the indicator of the slot format combination will be referred to as "SlotFormatCombinationId", and the maximum value of the slot format combination indexes indicated by the indicator of the slot format combination will be referred to as "maxSFIindex". For example, if 0, 1, 2, and 3 are configured as SlotFormatCombinationId capable of being indicated by the dynamic SFI for any one UE, the UE may determine maxSFIindex to be 3.

FIG. 12 shows a format of an indicator of a slot format combination according to an embodiment of the present invention.

In an embodiment of the present invention, when maxSFIindex is 0, the UE may determine that the number of dynamic SFI bits to be monitored by the UE is 1. When maxSFIindex is greater than 0, the UE may determine that the number of dynamic SFI bits to be monitored by the UE is ceil(log$_2$(maxSFIindex+1)). Here, ceil(x) represents the smallest number among the integers equal to or greater than "x". Regardless of the number of slot format combinations that the base station is able to indicate through the dynamic SFI, the UE may determine that the number of dynamic SFI bits to be monitored by the UE is max(ceil(log$_2$(maxSFIindex+1)), 1). Here, max(a, b) represents the greater value of "a" and "b". Table 6 shows examples of the number of dynamic SFI bits according to maxSFIindex. According to Table 6, if maxSFIindex according to an embodiment of the present invention is greater than 0, the UE determines the number of dynamic SFI bits to be monitored by the UE to be ceil(log$_2$(maxSFIindex+1)) or max(ceil(log$_2$(maxSFIindex+1)), 1), which indicate the same number of dynamic SFI bits. In addition, if the value of maxSFIindex is 0, it indicates one bit. The UE may expect that at least one bit of dynamic SFI is to be transmitted, and may monitor the PDCCH in which the dynamic SFI is transmitted.

TABLE 6

| | maxSFIndex | 1 | 2 | 3 | 4 | 5 | ... | N > 0 |
|---|---|---|---|---|---|---|---|---|
| Number of dynamic SFI bits | 1 if maxSFIndex = 0, otherwise ceil(log$_2$(maxSFIndex + 1)) | 1 | 1 | 2 | 2 | 3 | ... | ceil(log$_2$(N + 1)) |
| | max(ceil(log$_2$(maxSFIndex)) + 1, 1) | 1 | 1 | 2 | 2 | 3 | ... | ceil(log$_2$(N + 1)) |

When maxSFIindex is 0, the UE may operate as follows depending on the value of the dynamic SFI. When the dynamic SFI value is 0, the UE may determine that the slot has been configured according to one slot entry configured for the UE through an RRC signal by the base station. In addition, the UE may not expect that the dynamic SFI value is 1. In another specific embodiment, when the value of the dynamic SFI is 1, the UE may perform an operation corresponding to the case in which a PDCCH including the dynamic SFI fails to be received. In another specific embodiment, when the value of the dynamic SFI is 1, the UE may cancel transmission and reception of all semi-static RRC-configured measurement signals. The RRC-configured measurement signal may include at least one of CSI-RS measurement, periodic SRS transmission, and PDCCH monitoring.

In another embodiment of the present invention, the UE may not expect that maxSFIindex capable of being indicated through the dynamic SFI by the base station is 0. In this case, the UE may determine the number of dynamic SFI bits to be monitored by the UE to be ceil(log$_2$(maxSFIindex+1)). Here, maxSFIindex is the maximum value among the indexes of the slot format combinations that the base station is able to indicate through the dynamic SFI. In addition, ceil(x) represents the smallest number among the integers equal to or greater than "x".

In another embodiment of the present invention, when the number of slot format combination indexes that the base station is able to indicate through dynamic SFI is 0, the UE may determine the number of dynamic SFI bits to be monitored by the UE to be 0. In this case, the UE may not monitor the PDCCH including the dynamic SFI. The UE may not monitor the PDCCH including the dynamic SFI, and may determine that the slot has been configured according to the entry of one slot format combination configured for the UE through an RRC signal by the base station.

The above-described embodiments may be applied to the case in which the PDCCH includes a plurality of pieces of dynamic SFI on a plurality of cells, as well as the case in which the PDCCH includes the dynamic SFI on one cell.

In the case where one PDCCH includes a plurality of pieces of dynamic SFI on a plurality of cells, the UE may determine the length of the dynamic SFI as follows. In this case, the base station may configure a slot format combination for the UE in each cell. The UE may receive the PDCCH, and may determine the entry of the slot format combination or the slot format combination index of each cell. In an embodiment of the present invention, the bit length of the dynamic SFI of one cell may be determined according to the number of slot format combinations configured for the corresponding cell. When the number of slot format combinations of cell "c" is $N_C$, the UE may determine that the length of the dynamic SFI is max(ceil(log$_2$ ($N_C$)), 1) as the above-described embodiment for one cell. In another embodiment of the present invention, the UE may determine the length of the dynamic SFI of a corresponding cell according to the maximum value of the slot format combination indexes configured in one cell. When the maximum value of the slot format combination indexes of cell "c" is maxSFIindex$_C$, the UE may determine that the length of the dynamic SFI is max(ceil(log$_2$(maxSFIindex$_C$+1)), 1) as the above-described embodiment for one cell.

Figure 13:
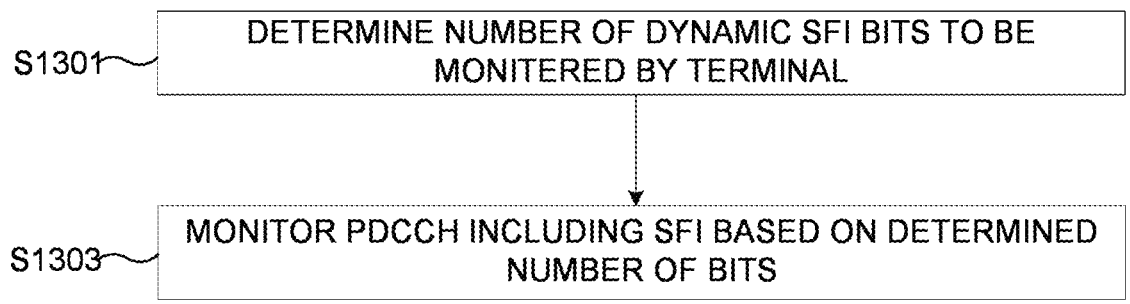
FIG. 13 shows the operation of user equipment according to an embodiment of the present invention.

In the case where the length of the dynamic SFI of at least one cell is greater than or equal to 1 bit, even if the length of the dynamic SFI of another cell is 0 bits, the UE may monitor the PDCCH including a plurality of pieces of dynamic SFI because the bit length of a plurality of pieces of dynamic SFI is not 0 bits. The UE may operate according to the following embodiment. When one PDCCH includes two pieces of dynamic SFI on at least two cells, the UE may determine the bit length of the dynamic SFI on the two cells as follows. The UE may determine the bit length (payload$_1$) of the dynamic SFI on the first cell to be ceil(log 2($N_1$)) or ceil(log$_2$(maxSFIindex$_1$+1)). The UE may determine the length of the dynamic SFI on the second cell to be ceil(log 2($N_2$)) or ceil(log$_2$(maxSFIindex$_2$+1)). When the sum of the bit lengths of two pieces of dynamic SFI (payload$_1$+payload$_2$) is greater than 0, the bit length of the first dynamic SFI is payload$_1$, and the bit length of the second dynamic SFI is payload 2. The bit length of the entire dynamic SFI is payload$_1$+payload$_2$. If the sum of the bit lengths of the two pieces of dynamic SFI (payload$_1$+payload$_2$) is 0, the UE may assume that the length of the entire dynamic SFI is payload$_1$+payload$_2$=1. That is, if the sum of the lengths of the two pieces of dynamic SFI is 0, the UE may monitor the PDCCH on the assumption that the total number of dynamic SFI bits included in the PDCCH is at least 1. In this case, when the UE succeeds in receiving the PDCCH, the UE may determine the format of a slot in each cell according to the slot format combination corresponding to each cell. When the UE fails to receive the PDCCH, the UE may perform an operation corresponding to the case in which the dynamic SFI fails to be received in both cells. FIG. 13 shows the operation of the UE according to an embodiment of the present invention.

The UE determines the number of dynamic SFI bits to be monitored by the UE (S1301). In this case, the UE may determine the number of dynamic SFI bits to be monitored by the UE according to the above-described embodiments. Specifically, the number of dynamic SFI bits may be determined based on the maximum value of the slot format combination indexes capable of being indicated by the dynamic SFI transmitted to the UE. When the maximum value of the slot format combination indexes capable of being indicated by the dynamic SFI transmitted to the UE is 0, the UE may determine the number of dynamic SFI bits to be 1. Specifically, the UE may determine the number of dynamic SFI bits according to max(ceil(log$_2$(maxSFIindex+ 1)), 1). Here, max(a, b) may represent the greater value among "a" and "b", and maxSFIindex may represent the maximum value of the slot format combination indexes capable of being indicated by the dynamic SFI transmitted to the UE. In another specific embodiment, the UE may determine the number of dynamic SFI bits based on the number of slot format combinations capable of being indicated by the dynamic SFI transmitted to the UE. When the number of slot format combinations capable of being indicated by the dynamic SFI transmitted to the UE is 1, the UE may determine the number of dynamic SFI bits to be monitored by the UE to be 1. Specifically, the UE may determine the number of dynamic SFI bits according to max(ceil(log$_2$(N)), 1). "N" represents the number of slot format combinations capable of being indicated by the dynamic SFI transmitted to the UE. In addition, the UE may determine the number of dynamic SFI bits to be monitored by the UE according to the above-described embodiments with reference to the drawings preceding FIG. 13.

The UE may monitor the PDCCH including the dynamic SFI based on the determined number of bits (S1303). When the UE receives the dynamic SFI, the UE may determine the slot format combination configured for the UE based on a value of the dynamic SFI. The UE may perform transmission or reception based on the slot format combination configured for the UE. When the base station configures only one slot format combination for the UE and the entry of the slot format combination or the slot format combination index is 0, the UE may operate as follows. In a specific embodiment, when the number of dynamic SFI bits is 1 and the value of the dynamic SFI is 1, the UE may cancel transmission and reception of semi-static RRC-configured measurement signals. The RRC-configured measurement signal may include at least one of CSI-RS measurement, periodic SRS transmission, and PDCCH monitoring. In another specific embodiment, when the number of dynamic SFI bits is 1 and the value of the dynamic SFI is 1, the UE may perform an operation corresponding to the case in which the PDCCH including the dynamic SFI fails to be received. In another specific embodiment, when the number of dynamic SFI bits is 1, the UE may not expect that the value of the dynamic SFI is 1.

In the above-described embodiments, the physical data channel may include a PDSCH or a PUSCH. In addition, the physical control channel may include a PDCCH or a PUCCH. In addition, in the embodiment described using PUSCH, PDCCH, PUCCH, and PDCCH, other types of data channels and control channels may be applied.

The method and system of the present disclosure are described in relation to specific embodiments, configuration elements, a part of or the entirety of operations of the present disclosure may be implemented using a computer system having general purpose hardware architecture.

The aforementioned description of the present disclosure has been presented for the purposes of illustration and description. It is apparent to a person having ordinary skill in the art to which the present disclosure relates that the present disclosure can be easily modified into other detailed forms without changing the technical principle or essential features of the present disclosure. Therefore, these embodiments as described above are only proposed for illustrative purposes and do not limit the present disclosure. For example, each component described to be of a single type can be implemented in a distributed manner. Likewise, components described to be distributed can be implemented in a combined manner.

The scope of the present disclosure is presented by the accompanying Claims rather than the aforementioned description. It should be understood that all changes or modifications derived from the definitions and scopes of the Claims and their equivalents fall within the scope of the present disclosure.

The invention claimed is:

1. A user equipment for a wireless communication system, the user equipment comprising:
   a processor configured to: monitor a physical downlink control channel (PDCCH) including a downlink control information (DCI) and determine a number of dynamic slot format information (SFI) bits included in the DCI based on a maximum value of slot format combination indexes capable of being indicated by dynamic SFI received by the user equipment, wherein each of the slot format combination indexes identifies a slot format combination configured for the user equipment, the slot format combination indicates types of symbols included in one or more slots, and each of the types of symbols is any one of a downlink symbol, an uplink symbol, and a flexible symbol,
   wherein when the maximum value of the slot format combination indexes is 0, the user equipment determines that the number of the dynamic SFI bits is 1.

2. The user equipment of claim 1, wherein the processor is configured to determine the number of the dynamic SFI bits according to max(ceil(log$_2$(maxSFIindex+1)), 1),
   wherein max(a, b) represents a greater value of "a" and "b", and
   wherein maxSFIindex represents the maximum value of the slot format combination indexes.

3. The user equipment of claim 2, wherein when the user equipment receives the dynamic SFI, the processor is configured to determine a slot format combination configured for the user equipment based on a value of the dynamic SFI and perform transmission or reception based on the determined slot format combination.

4. The user equipment of claim 1, wherein when the user equipment receives the dynamic SFI, the processor is configured to determine a slot format combination configured for the user equipment based on a value of the dynamic SFI and perform transmission or reception based on the determined slot format combination.

5. The user equipment of claim 4, wherein the processor is configured to cancel transmission and reception of semi-static radio resource control (RRC)-configured measurement signals when the maximum value of the slot format combination indexes is 0 and the value of the dynamic SFI received by the user equipment is 1.

6. The user equipment of claim 4, wherein when the maximum value of the slot format combination indexes is 0, the processor is configured not to expect the value of the dynamic SFI to be 1.

7. The user equipment of claim 1, wherein the processor is configured to perform operations corresponding to a case where a PDCCH including the dynamic SFI is not received when the maximum value of the slot format combination indexes is 0 and a value of the dynamic SFI received by the user equipment is 1.

8. A method of operating a user equipment for a wireless communication system, the method comprising:
- monitoring a physical downlink control channel (PDCCH) including a downlink control information (DCI); and
- determining a number of dynamic slot format information (SFI) bits based on a maximum value of slot format combination indexes capable of being indicated by dynamic SFI received by the user equipment, wherein each of the slot format combination indexes identifies a slot format combination configured for the user equipment, wherein the slot format combination indicates types of symbols included in one or more slots, and wherein each of the types of symbols is any one of a downlink symbol, an uplink symbol, and a flexible symbol,
- wherein the determining the number of the dynamic SFI bits comprises when the maximum value of the slot format combination indexes is 0, determining that the number of the dynamic SFI bits is 1.

9. The method of claim 8, wherein the determining the number of dynamic SFI bits comprises determining the number of dynamic SFI bits according to max(ceil(log$_2$(maxSFIindex+1)), 1), wherein max(a, b) represents a greater value of "a" and "b", and
- wherein maxSFIindex represents the maximum value of the slot format combination indexes.

10. The method of claim 9, further comprising when the user equipment receives the dynamic SFI, determining a slot format combination configured for the user equipment based on a value of the dynamic SFI and performing transmission or reception based on the determined slot format combination.

11. The method of claim 8, further comprising when the user equipment receives the dynamic SFI, determining a slot format combination configured for the user equipment based on a value of the dynamic SFI and performing transmission or reception based on the determined slot format combination.

12. The method of claim 11, further comprising, when the maximum value of the slot format combination indexes is 0 and the value of the dynamic SFI is 1, cancelling transmission and reception of semi-static radio resource control (RRC)-configured measurement signals.

13. The method of claim 11, further comprising, when the maximum value of the slot format combination indexes is 0, not expecting the value of the dynamic SFI to be 1.

14. The method of claim 8, further comprising, when the maximum value of the slot format combination indexes is 0 and a value of the dynamic SFI is 1, performing operations corresponding to a case where a PDCCH including the dynamic SFI is not received.

* * * * *